United States Patent
Brooks et al.

(10) Patent No.: US 12,440,493 B2
(45) Date of Patent: Oct. 14, 2025

(54) COMBINATION THERAPY FOR TREATING CANCER COMPRISING SUBSTITUTED PIPERAZINES

(71) Applicant: Eli Lilly and Company, Indianapolis, IN (US)

(72) Inventors: Nathan Arthur Brooks, Fishers, IN (US); Raymond Gilmour, Indianapolis, IN (US)

(73) Assignee: Eli Lilly and Company, Indianapolis, IN (US)

(*) Notice: Subject to any disclaimer, the term of this patent is extended or adjusted under 35 U.S.C. 154(b) by 617 days.

(21) Appl. No.: 17/912,383

(22) PCT Filed: Mar. 22, 2021

(86) PCT No.: PCT/US2021/023436
§ 371 (c)(1),
(2) Date: Sep. 16, 2022

(87) PCT Pub. No.: WO2021/194946
PCT Pub. Date: Sep. 30, 2021

(65) Prior Publication Data
US 2023/0146387 A1 May 11, 2023

Related U.S. Application Data

(60) Provisional application No. 63/053,875, filed on Jul. 20, 2020, provisional application No. 63/024,713, filed on May 14, 2020, provisional application No. 62/993,254, filed on Mar. 23, 2020.

(51) Int. Cl.
| | | |
|---|---|---|
| C07D 241/08 | (2006.01) | |
| A61K 31/496 | (2006.01) | |
| A61K 31/519 | (2006.01) | |
| A61K 31/553 | (2006.01) | |
| A61K 31/706 | (2006.01) | |
| A61K 31/7068 | (2006.01) | |
| A61K 45/06 | (2006.01) | |
| A61P 35/00 | (2006.01) | |
| A61P 35/02 | (2006.01) | |

(52) U.S. Cl.
CPC ......... *A61K 31/519* (2013.01); *A61K 31/496* (2013.01); *A61K 31/553* (2013.01); *A61K 31/706* (2013.01); *A61K 31/7068* (2013.01); *A61K 45/06* (2013.01); *A61P 35/00* (2018.01); *A61P 35/02* (2018.01)

(58) Field of Classification Search
CPC .................................................... C07D 241/08
USPC .......................................................... 544/386
See application file for complete search history.

(56) References Cited

FOREIGN PATENT DOCUMENTS

| WO | 2013/046136 A1 | 4/2013 |
|---|---|---|
| WO | 2016/171755 A1 | 10/2016 |
| WO | 2017/019429 A1 | 2/2017 |
| WO | 2017/066571 A1 | 4/2017 |
| WO | 2017/213910 A1 | 12/2017 |
| WO | 2018/111707 | 6/2018 |
| WO | 2019/222553 A1 | 11/2019 |
| WO | 2021/194946 A1 | 9/2021 |
| WO | 2021/194950 A1 | 9/2021 |
| WO | 2021/194953 A1 | 9/2021 |
| WO | 2022/020281 A1 | 1/2022 |

OTHER PUBLICATIONS

1 Office Action, CA Application No. 3,172,669, dated Jan. 22, 2024, 6 pages.
Certificate of Grant, AU Application No. 2021242260, dated Mar. 28, 2024, 1 page.
Notice of Grant for Patent, AU Application No. 2021242260, dated Mar. 28, 2024, 1 page.
Rejection Decision, CN Application No. 202180024244.1, dated Apr. 29, 2024, 5 pages.
Response to Office Action, CA Application No. 3172669, dated May 22, 2024, 20 pages.
Popovici-Muller, J. et al., Discovery of AG-120 (Ivosidenib): A First-in-Class Mutant IDH1 Inhibitor for the Treatment of IDH1 Mutant Cancers, ACS Med. Chem. Lett. 2018, 300-305, 9.
Office Action, JP Application No. 2022-557831, dated Mar. 5, 2024, 3 pages.
Office Action, EA Application No. 202292409, dated Jan. 30, 2024, 2 pages.
Observation on the Second Office Action, CN Application No. 202180024244.1, dated Feb. 18, 2024, 3 pages.
Choe, S. et al., Molecular Mechanisms Mediating Relapse Following Ivosidenib Monotherapy in Patients with IDH1-Mutant Relapsed or Refractory Acute Myeloid Leukemia, 61st American Society of Hematology Annual Meeting, Presentation 545, Dec. 9, 2019, 16 pages.
Rizzo, A. et al., Second-Line Treatment in Advanced Biliary Tract Cancer: Today and Tomorrow, Anticancer Research, 2020, 3013-3030, 40 (6).

(Continued)

*Primary Examiner* — Douglas M Willis
(74) *Attorney, Agent, or Firm* — Nielsen IP Law LLC

(57) ABSTRACT

The present invention relates to combination therapy with (a) a mutant IDH inhibitor having the Formula I and (b) one or more of an antimetabolite agent, a hypomethylating agent, and a mutant Flt3 (Flt3) inhibitor, for the treatment of cancer.

(I)

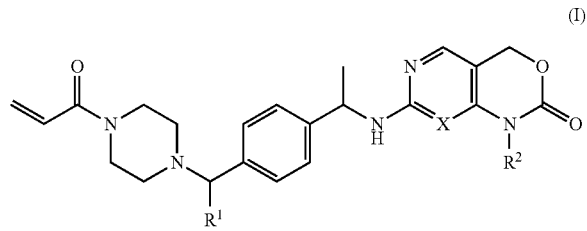

27 Claims, No Drawings

(56) References Cited

OTHER PUBLICATIONS

Paschka, P. et al., IDH1 and IDH2 Mutations Are Frequent Genetic Alterations in Acute Myeloid Leukemia and Confer Adverse Prognosis in Cytogenetically Normal Acute Myeloid Leukemia With NPM1 Mutation Without FLT3 Internal Tandem Duplication, J. Clin. Oncol., 2010, 3636-3643, 28.

Mcbride, A. et al., The Role of Inhibition of Apoptosis in Acute Leukemias and Myelodysplastic Syndrome, Frontiers in Oncology, 2019, 1-11, 9 (192).

Brooks, N. et al., Identification and Characterization of LY3410738, a Novel Covalent Inhibitor of Cancer-Associated Mutant Isocitrate Dehydrogenase 1 (IDH1), 2019, Cancer Res., 79 (13_Supplement): LB-274.

Brooks, N. et al., Identification and Characterization of LY3410738, a Novel Covalent Inhibitor of Cancer-Associated Mutant Isocitrate Dehydrogenase 1 (IDH1), 2019, [poster]. In: Proceedings of the American Association for Cancer Research Annual Meeting 2019; Mar. 29-Apr. 3, 2019; Atlanta, GA.

Salama, V. et al., LY3410738, A Novel Inhibitor of Mutant IDH1 is More Effective Than Ivosidenib and Potentiates Antileukemic Activity of Standard Chemotherapy in Preclinical Models of Acute Myeloid Leukemia (AML), 2020, Cancer Res., 80 (16_Supplement): 6417.

Salama, V. et al., LY3410738, A Novel Inhibitor of Mutant IDH1 is More Potent Than Ivosidenib (AG-120) and Potentiates Antileukemic Activity of Standard Chemotherapy in Preclinical Models of Acute Myeloid Leukemia (AML), 2020, [poster 8463]. In: Proceedings of the Annual Meeting of the American Association for Cancer Research 2020; Apr. 27-28 and Jun. 22-24, 2020. Philadelphia (PA).

Stein, E. M. et al., A Phase 1 Study of LY3410738, a First-in-Class Covalent Inhibitor of Mutant IDH in Advanced Myeloid Malignancies (Trial in Progress), 2020, [poster 2877], 62nd ASH Annual Meeting and Exposition; San Diego, CA; Dec. 5-8, 2020.

Stein, E. M. et al., A Phase 1 Study of LY3410738, a First-in-Class Covalent Inhibitor of Mutant IDH in Advanced Myeloid Malignancies (Trial in Progress), 2020, Blood, 136 (Supplement 1) 26.

Pauff, J. M. et al., A Phase 1 Study of LY3410738, a First-in-Class Covalent Inhibitor of Mutant IDH1 in Cholangiocarcinoma and Other Advanced Solid Tumors, 2021, Journal of Clinical Oncology, 39, 3.

Pauff, J. M. et al., A Phase 1 Study of LY3410738, a First-in-Class Covalent Inhibitor of Mutant IDH1 in Cholangiocarcinoma and Other Advanced Solid Tumors, 2021, [poster TPS350], ASCO GI Cancers Symposium, San Francisco, CA Jan. 15-17, 2021.

NCT04603001, Protocol ID: LOXO-IDH-20001, Study of Oral LY3410738 in Patients With Advanced Hematologic Malignancies With IDH1 or IDH2 Mutations, Submitted Date: Oct. 21, 2020 (v1); First Posted Oct. 26, 2020; ClinicalTrials.gov, https://classic.clinicaltrials.gov/ct2/history/NCT04603001?V_1=View#StudyPageTop.

NCT04521686, Protocol ID: LOXO-IDH-20002, Study of LY3410738 Administered to Patients With Advanced Solid Tumors With IDH1 Mutations, Submitted Date: Aug. 18, 2020 (v1); First Posted Aug. 20, 2020; ClinicalTrials.gov, https://classic.clinicaltrials.gov/ct2/history/NCT04521686?V_1=View#StudyPageTop.

International Search Report, International Application No. PCT/US2021/023442, dated Jul. 1, 2021, 4 pages.

Written Opinion of the International Searching Authority, International Application No. PCT/US2021/023442, dated Jul. 1, 2021, 6 pages.

International Search Report, International Application No. PCT/US2021/023452, dated Jul. 14, 2021, 5 pages.

Written Opinion of the International Searching Authority, International Application No. PCT/US2021/023452, dated Jul. 14, 2021, 5 pages.

International Search Report, International Application No. PCT/US2021/042268, dated Nov. 2, 2021, 4 pages.

Written Opinion of the International Searching Authority, International Application No. PCT/US2021/042268, dated Nov. 2, 2021, 7 pages.

Communication under Rule 71(3) EPC, EP Application 21718410.0, Nov. 10, 2023, 82 pages.

Response to Examination Report, AU Application No. 2021242260, Nov. 24, 2023, 18 pages.

Examination report No. 1 for standard patent application, AU Application No. 2021242260, dated Aug. 24, 2023, 4 pages.

Notice of Acceptance for Patent Application, AU Application No. 2021242260, dated Nov. 30, 2023, 3 pages.

Office Action, CN Application No. 202180024244.1, dated Jun. 30, 2023, 4 pages.

Observation on the First Office Action, CN Application No. 202180024244.1, dated Nov. 15, 2023, 3 pages.

Office Action, CN Patent Application No. 202180024244.1, dated Dec. 4, 2023, 4 pages.

International Search Report of the International Searching Authority pertaining to International Application No. PCT/US2021/023436; Date of Mailing: Jul. 1, 2021; 7 pages.

Written Opinion of the International Searching Authority pertaining to International Application No. PCT/US2021/023436; Date of Mailing: Jul. 1, 2021; 8 pages.

Fiorentini, A., Capelli, D., Saraceni, F., Menotti, D., Poloni, A., & Olivieri, A. (Jan. 24, 2020). The time has come for targeted therapies for AML: lights and shadows. *Oncology and therapy*, 8(1), 13-32.

COMBINATION THERAPY FOR TREATING CANCER COMPRISING SUBSTITUTED PIPERAZINES

The present invention relates to combination therapy with a mutant isocitrate dehydrogenase (IDH) inhibitor and one or more of an antimetabolite agent, a hypomethylating agent, and a mutant FMS-like tyrosine kinase 3 (Flt3) inhibitor, for the treatment of cancer.

IDH1 and IDH2 are enzymes that catalyzes the conversion of isocitrate to α-ketoglutarate, and reduces nicotinamide adenine dinucleotide phosphate (NADP$^+$) to NADPH (Megias-Vericat J, et al., *Blood Lymph. Cancer: Targets and Therapy* 2019; 9: 19-32).

Neomorphic (de novo) mutations in IDH1, e.g., at IDH1 amino acid residue R132, contribute to tumorigenesis in several types of cancer, including solid tumor cancers and hematologic malignancies (Badur M G, et al., *Cell Reports* 2018; 25: 1680). IDH1 mutations can result in high levels of 2-hydroxyglutarate (2-HG), which inhibits cellular differentiation, and inhibitors of mutant IDH1 can reduce 2-HG levels, which promotes cellular differentiation (Molenaar R J, et al., *Oncogene* 2018; 37: 1949-1960). Mutations also occur in IDH2, e.g., at amino acid residues R172, R140 and R172 (Yang H, et al., *Clin. Cancer. Res.* 2012; 18: 5562-5571; Mondesir J, et al., *J. Blood Med.* 2016; 7: 171-180).

For example, acute myeloid leukemia (AML) is characterized by a diverse spectrum of mutated genes and a multi-clonal genomic architecture comprising preleukemic and leukemic clones that evolve dynamically over time and under the selective pressure of therapy (Bloomfield C D, et al., *Blood Revs.* 2018; 32: 416-425).

Induction chemotherapy with cytarabine and an anthracycline ("7+3") has been the standard of care for more than 4 decades for subjects with newly diagnosed AML.

In recent years, five additional drugs have been approved by the U.S. Food and Drug Administration for treating AML: midostaurin, enasidenib, CPX-351, gemtuzumab ozogamicin (Bloomfield C D, et al., *Blood Revs.* 2018; 32: 416-425), and ivosidenib (Megias-Vericat J, et al., *Blood Lymph. Cancer: Targets and Therapy* 2019; 9: 19-32).

Approximately 60% to 70% of adults with AML can be expected to attain complete remission (CR) status following appropriate induction therapy, and more than 25% of adults with AML (about 45% of those who attain CR) can be expected to survive 3 or more years and may be cured.

However, IDH1 resistance mutations are observed in 7-14% of AML subjects, and the associated high 2-HG level can result in an epigenetic hyper-methylation phenotype and a block in differentiation, resulting in leukemogenesis (Megias-Vericat J, et al., *Blood Lymph. Cancer: Targets and Therapy* 2019; 9: 19-3). In addition, mutations in the Flt3 kinase are observed in approximately one third of AML subjects (Lee H J, et al., *Oncotarget* 2018; 9: 924-936).

Thus, there remains a need for alternative mutant IDH-related cancer therapies.

Certain mutant IDH1 and IDH2 inhibitors are disclosed in WO 2018/111707 A1, including a compound defined herein as "Compound A," which is a covalent inhibitor of mutant IDH1 that modifies a single cysteine (Cys269) in an allosteric binding pocket, rapidly inactivates the enzyme, and selectively inhibits 2-HG production, without affecting (α-KG) levels (WO 2018/111707 A1).

The present invention provides a method of treating cancer, comprising administering to a human cancer subject having an IDH mutation a therapeutically effective amount of (a) a first compound of Formula I:

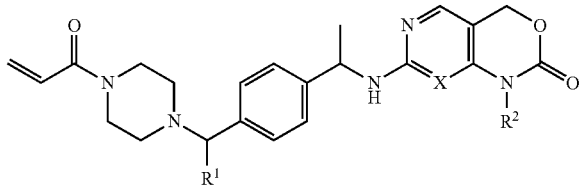

I wherein:
R$^1$ is —CH$_2$CH(CH$_3$)$_2$, —CH$_2$CH$_3$, —CH$_2$CH$_2$OCH$_3$, or —CH$_2$-cyclopropyl;
R$^2$ is —CH$_3$ or —CH$_2$CH$_3$; and
X is N or CH;
or a pharmaceutically acceptable salt thereof; and (b) one or more of a second compound that is an antimetabolite agent, or a pharmaceutically acceptable salt thereof; a hypomethylating agent, or a pharmaceutically acceptable salt of thereof and a mutant Flt3 inhibitor, or a pharmaceutically acceptable salt thereof.

In one embodiment, the IDH mutation is an IDH1 mutation or an IDH2 mutation. In another embodiment, the IDH mutation is an IDH1 mutation. In another embodiment, the IDH1 mutation is an IDH1 R132 mutation. In another embodiment, the IDH1 mutation is R132H. In another embodiment, the IDH1 mutation is R132C, R132G, R132L, or R132S. In another embodiment, the IDH1 R132 mutation is R132H. In another embodiment, the IDH1 mutation is R132C. In another embodiment, the IDH1 mutation is R132G. In another embodiment, the IDH1 mutation is R132L. In another embodiment, the IDH1 mutation is R132S.

In another embodiment, the IDH mutation is an IDH2 mutation. In another embodiment, the IDH2 mutation is an IDH2 R140 mutation or an IDH2 R172 mutation. In another embodiment, the IDH2 mutation is an R140 mutation. In another embodiment, the R140 mutation is R140Q, R140L, or R140W. In another embodiment, the IDH2 mutation is an R172 mutation. In another embodiment, the R172 mutation is R172K, R172M, R172G, R172S or R172W.

In one embodiment of the method of the invention, in the first compound of Formula I, or a pharmaceutically acceptable salt thereof, X is N. In another embodiment, in the first compound, X is N, R$^1$ is —CH$_2$-cyclopropyl, and R$^2$ is —CH$_2$CH$_3$, or a pharmaceutically acceptable salt thereof. In another embodiment, in the first compound, X is N, R$^1$ is —CH$_2$-cyclopropyl, and R$^2$ is —CH$_2$CH$_3$.

In another embodiment, the first compound is:
7-[[(1S)-1-[4-[(1R)-2-cyclopropyl-1-(4-prop-2-enoylpiperazin-1-yl)ethyl]phenyl]ethyl]amino]-1-ethyl-4H-pyrimido[4,5-d][1,3]oxazin-2-one;
7-[[(1S)-1-[4-[(1S)-2-cyclopropyl-1-(4-prop-2-enoylpiperazin-1-yl)ethyl]phenyl]ethyl]amino]-1-ethyl-4H-pyrimido[4,5-d][1,3]oxazin-2-one; or
1-Ethyl-7-[[(1S)-1-[4-[1-(4-prop-2-enoylpiperazin-1-yl)propyl]phenyl]ethyl]amino]-4H-pyrimido[4,5-d][1,3]oxazin-2-one;
or a pharmaceutically acceptable salt thereof.

In another embodiment, the first compound is 7-[[(1S)-1-[4-[(1S)-2-cyclopropyl-1-(4-prop-2-enoylpiperazin-1-yl)ethyl]phenyl]ethyl]amino]-1-ethyl-4H-pyrimido[4,5-d][1,3]oxazin-2-one.

In another embodiment, the first compound is:

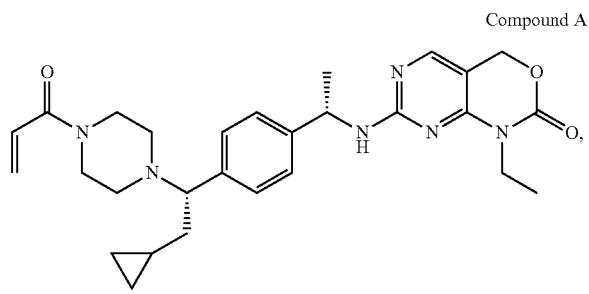 [SMILES: C=CC(=O)N1CCN([C@@H](CC2CC2)c2ccc([C@H](C)Nc3ncc4c(n3)N(CC)C(=O)OC4)cc2)CC1]

Compound A or a pharmaceutically acceptable salt thereof.

In another embodiment, the first compound is Compound A.

In another embodiment, the subject is identified as having an IDH1 mutation, e.g., an R132 IDH1 mutation. In another embodiment, the subject is identified as having an IDH2 mutation, e.g., an IDH2 R172, R140 or R172 mutation. In another embodiment, the subject is identified as having an IDH mutation in tissue.

In another embodiment, the cancer is a hematologic malignancy, and the subject is identified as having an IDH mutation in blood, bone marrow, lymph node or lymphatic fluid. In another embodiment, the subject is identified as having an IDH mutation in blood cells, bone marrow cells, lymph node cells, or lymphatic fluid cells.

In another embodiment, the cancer is a solid tumor cancer, and the subject is identified as having an IDH1 mutation in solid tumor tissue. In another embodiment, the subject is identified as having an IDH mutation in solid tumor tissue cells.

In another embodiment, prior to the administration of the mutant Flt3 inhibitor, the human subject had been identified as having a Flt3 mutation. In another embodiment, the Flt3 mutation is a Flt3 internal tandem (Flt3-ITD) mutation. In another embodiment, the Flt3 mutation is a Flt3 tyrosine kinase domain (Flt3-TKD) mutation. In another embodiment, the Flt3 mutation is a Flt3 D835 mutation.

In another embodiment, the first compound, or the pharmaceutically acceptable salt thereof, is administered before the second compound, or a pharmaceutically acceptable salt thereof.

In another embodiment, the first compound, or the pharmaceutically acceptable salt thereof, is administered after the second compound, or a pharmaceutically acceptable salt thereof.

In another embodiment, the first compound, or the pharmaceutically acceptable salt thereof, is co-formulated with the second compound, or a pharmaceutically acceptable salt thereof.

In another embodiment of the method of the invention, the cancer is a solid tumor cancer. In another embodiment, the solid tumor cancer is cholangiocarcinoma, head & neck cancer, chondrosarcoma, hepatocellular carcinoma, melanoma, pancreatic cancer, astrocytoma, oligodendroglioma, glioma, glioblastoma, bladder carcinoma, colorectal cancer, lung cancer, or sinonasal undifferentiated carcinoma. In another embodiment, the lung cancer is non-small cell lung cancer. In another embodiment, the lung cancer is non-small cell lung cancer, and an α-KR G12C inhibitor and/or an EGFR inhibitor is also administered. In another embodiment, the solid tumor is cholangiocarcinoma. In another embodiment, radiation therapy is also administered to the subject.

In another embodiment, the cancer is a hematologic malignancy. In another embodiment, the hematologic malignancy is AML, myelodysplastic syndrome myeloproliferative neoplasm, angioimmunoblastic T-cell lymphoma, T-cell acute lymphoblastic leukemia, chronic myelogenous leukemia, polycythemia vera, essential thrombocythemia, primary myelofibrosis, or chronic myelogenous leukemia. In another embodiment, the hematologic malignancy is AML.

In another embodiment of the method of the invention, the second compound is an antimetabolite agent, or a pharmaceutically acceptable salt thereof. In another embodiment of the method of the invention, the antimetabolite agent is cytarabine, 5-fluorouracil (5-FU), 6-mercaptourine (6-MP), capecitabine, floxuridine, fludarabine, gemcitabine, hydroxycarbamide, methotrexate, pemetrexed, or phototrexate, or a pharmaceutically acceptable salt of any one of them. In another embodiment, the antimetabolite agent is cytarabine, or a pharmaceutically acceptable salt thereof. In another embodiment, the anti-metabolite agent is cytarabine. In another embodiment, the first compound is Compound A, and the second compound is cytarabine. In another embodiment, the cancer is AML, the first compound is Compound A, and the second compound is cytarabine. In another embodiment, the cancer is cholangiocarcinoma, the first compound is Compound A, and the second compound is cytarabine.

In another embodiment of the method of the invention, the second compound is a hypomethylating agent, or a pharmaceutically acceptable salt thereof. In another embodiment of the method of the invention, the hypomethylating agent is azacitidine (5-azacitidine), 5-aza-2'-deoxycitidine (Decitabine), guadecitabine (SGI-110), 5-fluor-2'-deoxycitidine, zebularine, CP-4200, RG108, nanaomycin A, or a pharmaceutically acceptable salt of any one of them. In another embodiment, the hypomethylating agent is azacitidine, or a pharmaceutically acceptable salt thereof. In another embodiment, the hypomethylating agent is azacitidine. In another embodiment, the first compound is Compound A, and the second compound is azacitidine. In another embodiment, the cancer is AML, the first compound is Compound A, and the second compound is azacitidine. In another embodiment, the cancer is cholangiocarcinoma, the first compound is Compound A, and the second compound is azacitidine.

In another embodiment, the first compound of Formula I, or a pharmaceutically acceptable salt thereof, is administered with a hypomethylating agent, or a pharmaceutically acceptable salt thereof, and a Bcl-2 inhibitor, or a pharmaceutically acceptable salt thereof. In another embodiment the first compound of Formula I is administered with a hypomethylating agent and a Bcl-2 inhibitor. In another embodiment, the Bcl-2 inhibitor is venetoclax, obatoclax, navitoclax, or a pharmaceutically acceptable salt of any one of them. In another embodiment, the Bcl-2 inhibitor is venetoclax, or a pharmaceutically acceptable salt thereof. In another embodiment, the Bcl-2 inhibitor is venetoclax. In another embodiment, Compound A is administered with a hypomethylating agent and a Bcl-2 inhibitor. In another embodiment, Compound A is administered with azacitidine and venetoclax. In another embodiment, the cancer is AML, and Compound A is administered with azacitidine and venetoclax. In another embodiment, the cancer is cholangiocarcinoma, and Compound A is administered with azacitidine and venetoclax.

In another embodiment of the method of the invention, the second compound is a mutant Flt3 inhibitor, or a pharmaceutically acceptable salt thereof. In another embodiment of the method of the invention, the mutant Flt3 inhibitor is midostaurin, gilteritinib, quizartinib (AC220), sorafenib, sunitinib, lestaurtinib, or crenolanib, or a pharmaceutically acceptable salt of any one of them. In another embodiment, the mutant Flt3 inhibitor is midostaurin, or a pharmaceutically acceptable salt thereof. In another embodiment, the mutant Flt3 inhibitor is midostaurin. In another embodiment, the first compound is Compound A and the second compound is midostaurin. In another embodiment, the cancer is AML, the first compound is Compound A, and the second compound is midostaurin. In another embodiment, the cancer is cholangiocarcinoma, the first compound is Compound A, and the second compound is midostaurin.

In another embodiment of the method of the invention, Compound A is administered with an antimetabolite agent and a hypomethylating agent.

In another embodiment of the method of the invention, Compound A is administered with an antimetabolite agent and a mutant Flt3 inhibitor.

In another embodiment of the method of the invention, Compound A is administered with a hypomethylating agent and a mutant Flt3 inhibitor.

In another embodiment of the method of the invention, Compound A is administered with an antimetabolite agent, a hypomethylating agent and a mutant Flt3 inhibitor.

The present invention also provides a compound of Formula I:

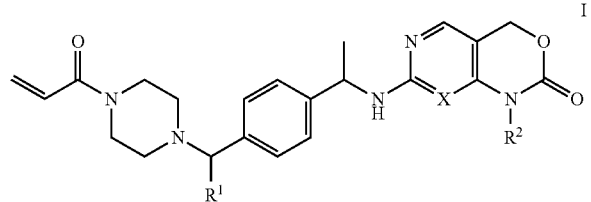

wherein:
$R^1$ is —CH$_2$CH(CH$_3$)$_2$, —CH$_2$CH$_3$, —CH$_2$CH$_2$OCH$_3$, or —CH$_2$-cyclopropyl;
$R^2$ is —CH$_3$ or —CH$_2$CH$_3$; and
X is N or CH;
or a pharmaceutically acceptable salt thereof;
for use in combination with one or more of an antimetabolite agent, or a pharmaceutically acceptable salt thereof; a hypomethylating agent, or a pharmaceutically acceptable salt thereof; or a mutant Flt3 inhibitor; or a pharmaceutically acceptable salt thereof, in the treatment of cancer in a human subject having an IDH mutation.

In one embodiment, the subject is identified with an IDH mutation, e.g., an IDH1 or ID2 mutation, in blood, bone marrow, lymph node, lymphatic fluid, blood cells, bone marrow cells, lymph node cells or lymphatic fluid cells.

In another embodiment, a compound of Formula I is used in combination with a hypomethylating agent (e.g., azacitidine), or a pharmaceutically acceptable salt thereof, and a Bcl-2 inhibitor, or a pharmaceutically acceptable salt thereof in the treatment of cancer in a human subject identified as having an IDH1 R132 mutation.

In one embodiment, the IDH mutation is an IDH1 mutation or an IDH2 mutation. In another embodiment, the IDH mutation is an IDH1 mutation. In another embodiment, the IDH1 mutation is an IDH1 R132 mutation. In another embodiment, the IDH1 mutation is R132H, R132C, R132G, R132L, or R132S. In another embodiment, the IDH1 R132 mutation is R132H. In another embodiment, the IDH1 mutation is R132C. In another embodiment, the IDH1 mutation is R132G. In another embodiment, the IDH1 mutation is R132L. In another embodiment, the IDH1 mutation is R132S.

In another embodiment, the IDH mutation is an IDH2 mutation. In another embodiment, the IDH2 mutation is an IDH2 R140 mutation or an IDH2 R172 mutation. In another embodiment, the IDH2 mutation is an R140 mutation. In another embodiment, the R140 mutation is R140Q, R140L, or R140W. In another embodiment, the IDH2 mutation is an R172 mutation. In another embodiment, the R172 mutation is R172K, R172M, R172G, R172S or R172W.

In one embodiment, the subject is identified as having an IDH mutation, e.g., an IDH1 or IDH2 mutation.

For the compound for use of Formula I, it is preferred that X is N, or a pharmaceutically acceptable salt thereof; it is preferred that $R^1$ is —CH$_2$-cyclopropyl, or a pharmaceutically acceptable salt thereof; it is preferred that $R^2$ is —CH$_2$CH$_3$, or a pharmaceutically acceptable salt thereof; it is preferred that X is N and $R^1$ is —CH$_2$-cyclopropyl, or a pharmaceutically acceptable salt thereof; it is preferred that $R^1$ is —CH$_2$-cyclopropyl and $R^2$ is —CH$_2$CH$_3$, or a pharmaceutically acceptable salt thereof; it is more preferred that X is N, $R^1$ is —CH$_2$-cyclopropyl, and $R^2$ is —CH$_2$CH$_3$, or a pharmaceutically acceptable salt thereof; it is most preferred that X is N, $R^1$ is —CH$_2$-cyclopropyl, and $R^2$ is —CH$_2$CH$_3$.

Preferred compounds are:
7-[[(1S)-1-[4-[(1R)-2-Cyclopropyl-1-(4-prop-2-enoylpiperazin yl)ethyl]phenyl]ethyl]amino]-1-ethyl-4H-pyrimido[4,5-d][1,3]oxazin-2-one;
7-[[(1S)-1-[4-[(1S)-2-cyclopropyl-1-(4-prop-2-enoylpiperazin yl)ethyl]phenyl]ethyl]amino]-1-ethyl-4H-pyrimido[4,5-d][1,3]oxazin-2-one; or
1-Ethyl-7-[[(1S)-1-[4-[1-(4-prop-2-enoylpiperazin yl)propyl]phenyl]ethyl]amino]-4H-pyrimido[4,5-d][1,3]oxazin-2-one;
or a pharmaceutically acceptable salt thereof.

In another embodiment, the first compound is:

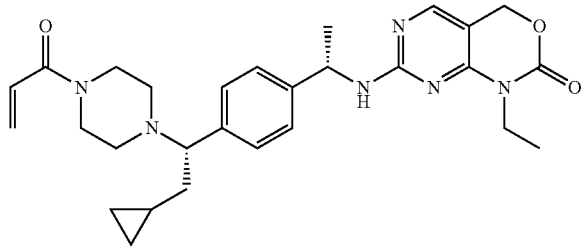 [SMILES: C=CC(=O)N1CCN([C@@H](CC2CC2)c2ccc([C@H](C)Nc3ncc4c(n3)N(CC)C(=O)OC4)cc2)CC1]

(Compound A), or a pharmaceutically acceptable salt thereof.

In another embodiment, the first compound is Compound A.

Novel methods for use of the combination of a compound of Formula I and one or more of an anti-metabolite, a hypomethylating agent, or a mutant Flt3 inhibitor to treat cancer are presented herein. Accordingly, some aspects of the present invention provide for a compound of Formula I for use in simultaneous, separate, or sequential combination with one or more of an anti-metabolite, a hypomethylating agent, or a mutant Flt3 inhibitor in the treatment of cancer in a subject as having an IDH mutation, e.g., an IDH1 or IDH2 mutation. Moreover, some aspects of the present invention provide for a compound of Formula I for use in simultaneous, separate, or sequential combination with one or more of an anti-metabolite, a hypomethylating agent, or a mutant Flt3 inhibitor in the treatment of a solid tumor cancer. Additionally, some aspects of the present invention provide for a compound of Formula I for use in simultaneous, separate, or sequential combination with one or more of an anti-metabolite, a hypomethylating agent, or a mutant Flt3 inhibitor in the treatment of a hematologic malignancy. Another aspect of the invention provides for a compound of Formula I for use in simultaneous, separate, or sequential combination with a hypomethylating agent and a Bcl-2 inhibitor in the treatment of cancer in a subject identified as having an IDH mutation, e.g., an IDH1 or IDH2 mutation.

In one embodiment, the IDH mutation is an IDH1 mutation or an IDH2 mutation. In another embodiment, the IDH mutation is an IDH1 mutation. In another embodiment, the IDH1 mutation is an IDH1 R132 mutation. In another embodiment, the IDH1 mutation is R132H, R132C, R132G, R132L, or R132S. In another embodiment, the IDH1 R132 mutation is R132H. In another embodiment, the IDH1 mutation is R132C. In another embodiment, the IDH1 mutation is R132G. In another embodiment, the IDH1 mutation is R132L. In another embodiment, the IDH1 mutation is R132S.

In another embodiment, the IDH mutation is an IDH2 mutation. In another embodiment, the IDH2 mutation is an IDH2 R140 mutation or an IDH2 R172 mutation. In another embodiment, the IDH2 mutation is an R140 mutation. In another embodiment, the R140 mutation is R140Q, R140L, or R140W. In another embodiment, the IDH2 mutation is an R172 mutation. In another embodiment, the R172 mutation is R172K, R172M, R172G, R172S or R172W.

The present invention also provides a pharmaceutical composition comprising a compound of Formula I, for use in combination with one or more of an antimetabolite agent, or a pharmaceutically acceptable salt thereof; a hypomethylating agent, or a pharmaceutically acceptable salt thereof; or a mutant Flt3 inhibitor; or a pharmaceutically acceptable salt thereof, in treating cancer in a human subject identified as having an IDH mutation. In one embodiment, the IDH mutation is identified in blood cells, bone marrow cells, or blood and bone marrow cells.

The present invention also provides the use of a compound of Formula I, in the manufacture of a medicament for the treatment of cancer in a human subject having an IDH mutation, e.g., an IDH1 or IDH2 mutation. In one embodiment, the subject is identified with the IDH mutation, in blood, bone marrow, lymph node, lymphatic fluid, blood cells, bone marrow cells, lymph node cells or lymphatic fluid cells, wherein the compound of Formula I for use in the manufacture of a medicament is administered in combination with one or more of an antimetabolite agent, or a pharmaceutically acceptable salt thereof; a hypomethylating agent, or a pharmaceutically acceptable salt thereof; or a mutant Flt3 inhibitor; or a pharmaceutically acceptable salt thereof.

In one embodiment of the method of the invention or compound for use of the invention, the cancer is frontline cancer. In another embodiment, the frontline cancer is a solid tumor cancer. In another embodiment, the frontline cancer is hematologic malignancy. In another embodiment, the frontline hematologic malignancy is frontline AML.

In another embodiment of the method of the invention or compound for use of the invention, the cancer is relapsed cancer. In another embodiment, the relapsed cancer is a solid tumor cancer. In another embodiment, the relapsed cancer is hematologic malignancy. In another embodiment, the relapsed hematologic malignancy is relapsed AML.

In another embodiment of the method of the invention or compound for use of the invention, the cancer is refractory cancer. In another embodiment, the refractory cancer is a solid tumor cancer. In another embodiment, the refractory cancer is hematologic malignancy. In another embodiment, the refractory hematologic malignancy is refractory AML.

In another embodiment of the method of the invention or compound for use of the invention, the cancer is advanced cancer. In another embodiment, the advanced cancer is an advanced solid tumor cancer. In another embodiment, the advanced cancer is an advanced hematologic malignancy. In another embodiment, the advanced hematologic malignancy is advanced AML.

In another embodiment, the AML is acute promyelocytic leukemia.

Methods for assaying mutant IDH1 enzyme activity are known to those of ordinary skill in the art, e.g., in WO 2018/111707 A1.

As used above, and throughout the description of the invention, the following terms, unless otherwise indicated, shall be understood to have the following meanings:

The term "hematologic tissue" refers to blood, bone marrow, spleen, lymph node, or lymphatic fluid.

The term "solid tumor tissue" refers to tissue that is not hematologic tissue. Non-limiting examples of solid tissue are cholangial tissue, pancreatic tissue, head tissue, neck tissue, hepatic tissue, skin tissue, astrocytomal tissue, oligodendroglial tissue, glial tissue, brain tissue, bladder tissue, colorectal tissue, lung tissue, and sinonasal undifferentiated cancer tissue.

The term "solid tumor cancer" means that the cancer originated in a tissue that is not blood or bone marrow.

The term "hematologic malignancy" relates to cancer that originated in the blood, bone marrow, lymph node or lymphatic fluid.

The term "frontline cancer" means that the human cancer subject has never been treated for the cancer being treated.

The term "refractory cancer" refers to cancer that has been treated, but the human cancer subject did not respond to treatment.

The term "relapsed cancer" means that the human cancer subject responded to treatment for a period of time, but that the cancer has reoccurred.

The term "advanced cancer" refers to cancer that has spread to lymph nodes or to other tissues outside of the cancer's point of origin. For example, advanced AML is AML that has spread to a tissue outside of the blood or the bone marrow.

The term "cancer subject" means a subject who has been diagnosed with cancer.

The term "solid tumor subject" means a subject who has been diagnosed with a solid tumor cancer. In one embodiment, the solid tumor cancer is cholangiocarcinoma.

The term "hematologic malignancy subject" means a subject who has been diagnosed with a hematologic malignancy. In one embodiment, the hematologic malignancy subject is an AML subject. The term "AML subject" means a subject who has been diagnosed with AML. Methods for diagnosing AML are known to those of ordinary skill in the art, e.g., in Dohner H, et al., *Blood* 2017; 129: 424-447.

The terms "acute myeloid leukemia," "acute myelogenous leukemia," and "acute nonlymphocytic leukemia" are synonymous.

"Responsiveness to hematologic malignancy (e.g., AML) treatment" includes improvement in overall survival, partial response, long-term stable disease, or improvement in long-term survival characterized as complete remission (determined by less than 5% myeloblasts in bone marrow, the absence of circulating blasts, hematologic recovery (as evidenced by a peripheral blood absolute neutrophil count greater than 1,000 cells/µL and a platelet count greater than 100,000/µL, without the need for red blood cell transfusion, and the absence of extramedullary disease) (Bloomfield C D, et al., *Blood Revs.* 2018; 32: 416-425).

The term "IDH1 R132 mutation" is synonymous with "R132 IDH1 mutation," and refers to an IDH1 mutation at amino acid residue 132 in a subject's IDH1 gene, as determined, e.g., in the subject's nucleic acid (e.g., DNA).

The term "Flt3 mutation" refers to a mutation in a subject's Flt3 gene.

The term "mutant IDH inhibitor" refers to a compound that inhibits the enzyme activity of and/or the production of 2-HG by a mutant IDH enzyme. Methods for assaying mutant IDH1 and IDH2 enzyme activity are known to those of ordinary skill in the art, e.g., in WO 2018/111707 A1. In the term "mutant IDH inhibitor, the word "mutant" refers to the IDH gene, not the inhibitor.

The term "mutant Flt3 inhibitor" refers to a compound that inhibits mutant F13 kinase activity. Methods for assaying mutant Flt3 activity are known to those of ordinary skill in the art, e.g., in Lee H J, et al., *Oncotarget* 2018; 9: 924-936. In the term "mutant Flt3 inhibitor," the word "mutant" refers to the Flt3 protein, not to the inhibitor compound.

The term "identified as having an IDH mutation," e.g., an IDH1 or IDH2 mutation means that nucleic acid (e.g., DNA) from a human subject's tissue or cells has been analyzed to determine if the human subject has an IDH mutation. In one embodiment, the human subject's blood, bone marrow, lymph node, lymphatic fluid, blood cells, bone marrow cells, lymph node cells, or lymphatic fluid cells has been analyzed for an IDH mutation. In another embodiment, the human subject's solid tissue has been analyzed for an IDH mutation.

The term "Bcl-2 inhibitor" is a compound that binds to Bcl-2, and results in one or more of cytotoxicity in cancer cells, downregulation of Bcl-2 expression in cancer cells, mitochondrial dysfunction in cancer cells, and apoptosis in cancer cells. Methods for determining those effects are known to those of ordinary skill in the art, e.g., in Wen M, et al., *Front. Pharmacol.* 2019; 10: 391.

In one embodiment of the method of the present invention, the party who identifies the human subject as having an IDH1 R132 mutation can be different than the party that administers the first and second compounds. In another embodiment, the party who identifies the human subject as having an IDH1 R132 mutation is different than the party that administers the first and second compounds. In another embodiment, the party who identifies the human subject as having an IDH1 R132 mutation is the same as the party that administers the first and second compounds.

The term "identified as having a Flt3 mutation" means that nucleic acid (e.g., DNA) from a human subject's blood cells, bone marrow cells, or blood cells and bone marrow cell had been analyzed to determine if the human subject has one or more Flt3 mutations.

Analytical methods for identifying IDH1 and Flt3 mutations are known to those of ordinary skill in the art (Clark, O., et al., *Clin. Cancer. Res.* 2016; 22: 1837-42), including, but not limited to, karyotyping (Guller J L, et al., *J. Mol. Diagn.* 2010; 12: 3-16), fluorescence in situ hybridization (Yeung D T, et al., *Pathology* 2011; 43: 566-579), Sanger sequencing (Lutha, R et al., *Haematologica* 2014; 99: 465-473), metabolic profiling (Miyata S, et al., *Scientific Reports* 2019; 9: 9787), polymerase chain reaction (Ziai, J M and A J Siddon, *Am. J. Clin. Pathol* 2015; 144: 539-554), and next-generation sequencing (e.g., whole transcriptome sequencing) (Lutha, R et al., *Haematologica* 2014; 99: 465-473; Wang H-Y, et al., *J. Exp. Clin. Cancer Res.* 2016; 35: 86).

The terms "treatment," "treat," "treating," and the like, are meant to include slowing, stopping, or reversing the progression of cancer. These terms also include alleviating, ameliorating, attenuating, eliminating, or reducing one or more symptoms of a disorder or condition, even if the cancer is not actually eliminated and even if progression of the cancer is not itself slowed, stopped or reversed.

"Therapeutically effective amount" means the amount of a compound, or pharmaceutically acceptable salt thereof, administered to the subject that will elicit the biological or medical response of or desired therapeutic effect on a subject.

A therapeutically effective amount can be readily determined by the attending clinician, as one skilled in the art, by the use of known techniques and by observing results obtained under analogous circumstances. In determining the effective amount for a subject, a number of factors are considered by the attending clinician, including, but not limited to: size, age, and general health of the individual subject; the specific disease or disorder involved; the degree of or involvement or the severity of the disease or disorder; the response of the individual subject; the particular compound administered; the mode of administration; the bioavailability characteristics of the preparation administered; the dose regimen selected; the use of concomitant medication; and other relevant circumstances.

The term "in combination with" means that a compound of Formula I is used, or is for use, in simultaneous, separate, or sequential combination with any one or more of an antimetabolite agent, or a pharmaceutically acceptable salt thereof; a hypomethylating agent, or a pharmaceutically acceptable salt thereof, optionally in combination with a Bcl-2 inhibitor or a pharmaceutically acceptable salt thereof; or a mutant Flt3 inhibitor; or a pharmaceutically acceptable salt thereof, in the treatment of cancer in a human subject having an IDH mutation.

The compounds administered in the method of the invention can optionally be formulated as pharmaceutical compositions administered by any route which makes the compounds bioavailable. In an embodiment, such compositions are formulated for oral administration. Such pharmaceutical compositions and processes for preparing the same are well known in the art. (See, e.g., Remington: The Science and Practice of Pharmacy (D. B. Troy, Editor, 21st Edition, Lippincott, Williams & Wilkins, 2006).

A "pharmaceutically acceptable carrier, diluent, or excipient" is a medium generally accepted in the art for the delivery of biologically active agents to mammals, e.g., humans.

It will be understood by one of ordinary skill in the art that compounds administered in the method of the invention are capable of forming salts. The compounds react with any of a number of inorganic and organic acids to form pharmaceutically acceptable acid addition salts. Such pharmaceutically acceptable acid addition salts and common methodology for preparing them are well known in the art. See, e.g., P. Stahl, et al., HANDBOOK OF PHARMACEUTICAL SALTS: PROPERTIES, SELECTION AND USE, (VCHA/Wiley-VCH, 2008).

"Pharmaceutically acceptable salts" or "a pharmaceutically acceptable salt" refers to the relatively non-toxic, inorganic and organic salt or salts of the compounds of the present invention (S. M. Berge, et al., "Pharmaceutical Salts", *Journal of Pharmaceutical Sciences*, Vol 66, No. 1, January 1977).

Materials and Methods

Compounds and Formulation. For in vivo studies, each test article is prepared at an appropriate concentration with vehicle. For in vivo studies, Compound A is formulated in Acacia vehicle (water, 10% Acacia, 0.05% Antifoam [Dow Corning 1510-US]) with 1.1 molar equivalents HCl. Compound A is prepared fresh at the appropriate concentrations with vehicle every 7 days and stored at 4° C. between doses. Midostaurin (Medchem Express, batch/Lot #23950) is formulated in 20% PEG400 in water and prepared fresh weekly (stored at 4° C. between doses). Cytarabine is prepared fresh weekly by dilution with sterile saline from stock solution of Cytarabine (injection 20 mg/mL, (Pfizer injectables')). Azacitidine (Sigma, Lot #MKBR7212) is formulated in sterile water and is prepared fresh daily immediately before dosing.

In vivo human AML PDx models. AML models are established following tail vein injection of primary human AML cells into female NOD SCID Gamma (NSG, NOD.Cg-Prkdcscid Il2rgtm1Wjl/SzJ [Jackson Labs #005557]) mice (6 to 7 weeks of age). Two models are used in the studies: (1) IDH1(R132H), NRas(Q61H) primary human AML and (2) IDH1(R132H), Flt3-ITD primary human AML. As needed, splenocytes from tumor-bearing mice are used to propagate and expand the models, as described. Each test article is prepared as described above at an appropriate concentration with vehicle to give animals the doses tested in this study at a dosing volume of 10 µL/gram body weight. Mice receiving Compound A (PO, QD) are treated at the indicated doses for the duration of the study. The combination agents are dosed as follows: Midostaurin 50 mg/kg PO, QD (53 days, starting 7 days after Compound A dose start), Cytarabine 2 mg/kg IP [(QD×5, rest 2)×2] rest 14 d and repeat (2 cycles, beginning at Compound A dose start), Azacitidine 1 mg/kg IP [(QD x 5, rest 2)×2] rest 14 d and repeat (2 cycles, beginning at Compound A dose start). Treated mice are assessed in comparison to vehicle treated and naïve (non-tumor bearing) control mice. Body weight is recorded twice per week. Whole blood samples (<100 µL) are collected biweekly by submandibular bleed, into K-EDTA blood collection tubes over the course of the study and analysis performed by FACS to monitor differentiation state and leukemic burden in the study mice (plasma is collected for 2-HG analysis periodically over the course of the study). For plasma collection, fifty to seventy µL of whole blood is aliquoted into 1.5 mL microfuge tubes for each subject and spun at 300×g for 8 minutes (4° C.). Ten µL of plasma is collected and transferred to new 1.5 mL microfuge tubes and frozen at −80° C. for 2-HG LCMS analysis. Inhibition of 2-HG production is monitored by assessment of plasma 2-HG using plasma from vehicle treated, and naïve mice as controls. For flow cytometry, 50-70 µL of whole blood are collected, 60 µL stain/wash buffer (5% heat inactivated (HI)-FBS(v/v) (Invitrogen 10082) in DPBS (HyClone SH30028)) is added per tube, mixed up and down 3 to 4 times by pipette, and 100 µL of the blood suspension is transferred to 5 mL polypropylene tubes, stained and analyzed as described below.

AML PDx model propagation. Mice implanted with human IDH1(R132H) AML cells are identified with advanced disease progression by flow cytometry of whole blood samples in the patient-derived IDH1(R132H) leukemia models. Spleens are processed and splenocytes isolated as described below. Two hundred µL per subject of the splenocyte prep is injected IV (intravenous, tail vein) into recipient NSG mice. ($10e^6$-$25e^6$ viable white cells per mL, $2e^6$-$5e^6$ per mouse, is used to propagate the models). Progression is monitored by flow cytometry analysis, once every four weeks until AML is identified in the peripheral blood (>0.2% human AML cells (% hCD33+hCD45+ of total white blood cells) (WBCs)). Once engraftment is confirmed, the mice are monitored biweekly until ready to be put on study. The mice are randomized and the study is initiated when the mean % human AML (of total WBCs) reaches 2-8%. Submandibular blood is collected.

Spleen/Splenocyte Processing and Prep. After excision, a spleen is weighed, and % of the spleen is placed in a standard sterile 15 mL polypropylene conical tube containing PBS, and placed on ice. The remaining ¼ of the spleen is fixed in 10% NBF and delivered to pathology. The spleen is placed in ice cold sterile PBS in a 15 mL collection tube. The spleen is removed from the collection tube and placed in a 100 micron 50 mL conical tube cell strainer (BD Falcon #352360). The spleen is processed by gentle rubbing of the spleen tissue against the surface of the cell strainer with the end of a 5 mL syringe plunger in a circular motion. The surface of the strainer is rinsed with 10 mL room temperature sterile DPBS (HyClone SH30028) 3 times during the process. After no intact spleen tissue is visible, a final rinse of the strainer is performed and the cell prep is mixed up and down 15 times, using a 10 mL sterile serological pipette. The cell pellet is collected by centrifugation (300×g) and washed three times with 30 mL sterile DPBS. The cells are counted and resuspended in DPBS at the desired implant concentration.

Bone Marrow Collection. Bone marrow is collected from the tibia and femur, using a 27G to 25G needle with 1 mL syringe, containing 1 mL of PBS.

Flow cytometry analysis of human white cells. Submandibular blood samples from in vivo studies are collected. Fluor-conjugated antibody stains are added according to the manufacturer's instructions (anti-human CD33-PE (clone WM53, BD Cat #555450), anti-human CD14-APC (clone MφpP9, BD Cat #340436), anti-human CD15-V450 (clone HI98, BD Cat #561584), anti-human CD117-BV421 (clone YB5.B8, BD Cat #562434), anti-human CD11b-APCCy7 (clone ICRF44, BD Cat #557754), anti-human CD45-PECy7 (clone HI30, BD Cat #557748), and anti-human CD3-FITC (clone SK7, BD Cat #340542)). The samples are incubated for 30 minutes at room temperature, protected from light. After the incubation, 1.5 mL 1×BD Lyse/Fix (37° C., (BD #558049)) is added to each sample and incubated for 12 minutes at room temperature. The tubes are centrifuged at 300×g for 7 minutes. BD Lyse/Fix solution is aspirated and the cell pellet washed with stain/wash buffer 3 times (1 wash step consisted of: pellet resuspended in 3 mL stain/wash buffer, centrifuged at 300×g, aspirated wash). Fixed cells are then resuspended in 300 to 400 µL stain/wash buffer. Samples are analyzed on a Becton Dickinson FACS-Verse Flow cytometer (Cat #651155 Serial #Z6511550447)

using standard flow cytometry principles and techniques. Samples are analyzed on the same day as they are stained and fixed. Population gating and data analysis of percent population are performed in the FACSuite software on the FACSVerse cytometer. Percent population values from the data analysis are plotted in Graphpad Prism or in JMP13. If an animal succumbs to disease or if blood is unable to be obtained for technical reasons on any given day, a data point will be absent for that day and is thus not determined (ND). LC-MS metabolite analysis in plasma of AML PDx model. The effects of IDH1 inhibition on the concentrations of total 2-HG and α-KG are determined by liquid chromatography-mass spectrometry (LC-MS) analysis of plasma. Calibration curves are prepared by spiking 2-HG and α-KG into water. The method utilized derivatization with O-benzylhydroxylamine prior to analysis by LC-MS. Ten microliters of each standard or sample is placed into a deep-well 96-well plate and combined with 100 µL of internal standard solution containing 10 µM d5-3-hydroxyglutarate and 10 µM d6-α-KG. Plasma samples are then treated with 210 uL 4:3 methanol:chloroform centrifuged and the supernatant is removed and dried. 100 uL of 1 M O-benzyl-hydroxylamine in pyridine buffer (8.6% pyridine, pH 5) and 100 uL of 1 M N-(3-dimethylaminopropyl)-N-ethylcarbodiimide hydrochloride (EDC) in pyridine buffer is added to each sample. The derivatization reaction proceeds at room temperature for one hour. Using a Beckman Biomek FX liquid handler 300 µL of ethyl acetate is added to each sample. Plates are sealed and vortexed for 5 minutes, and then centrifuged for 5 minutes at 4000 rpm on in Eppendorf 5810R centrifuge. 220 µL of the upper layer is transferred to a new 96-well plate. Samples are dried under heated nitrogen at 50° C. and reconstituted with 100 µL of methanol/water (1:1). One microliter of derivatized sample is injected onto an LC-MS system consisting of a Shimadzu Prominence 20A HPLC system and a Thermo Quantum Ultra™ triple quadrupole mass spectrometer. Analytes are separated on a Water XBridge™ C18 column (2.1×50 mm, 3.5 µm) with a flow rate of 0.6 mL/minute. Mobile phase A is 0.1% formic acid in water and mobile phase B is methanol. The gradient profile is: 0 minutes, 5% B; 2 minutes, 100% B; 4.00 minutes, 100% B; 4.1 minutes, 5% B; 5.50 minutes, stop. The mass spectrometer utilizes a HESI-II probe operated in positive ion selected reaction monitoring mode. Calibration curves are constructed by plotting analyte concentrations vs. analyte/internal standard peak area ratios and performing a quadratic fit of the data using a 1/concentration weighting with Xcalibur™ software. Analyte concentrations for the unknowns are back-calculated from the calibration curves.

Statistical Methods

The Combination Analysis Method (Bliss Independence for IVEF studies) can be utilized to analyze the results. The usual repeated measures model is fit to log volume vs. group and time. Contrast statements are used to test for an interaction effect at each time point using the two specific treatments that are combined. This is equivalent to the Bliss Independence method and assumes that tumor volumes can, in theory, reach zero, i.e., complete regression.

The expected additive response (EAR) for the combination is calculated on the tumor volume scale as: response (EAR) EAR volume=V1*V2/V0, where V0, V1, and V2 are the estimated mean tumor volumes for the vehicle control, treatment 1 alone, and treatment 2 alone, respectively. If the interaction test is significant, the combination effect is declared statistically more than additive or less than additive depending on the observed combination mean volume being less than or more than the EAR volume, respectively. Otherwise, the statistical conclusion is additive.

If stasis is the best expected response, then the Bliss method can be applied directly to the % delta T/C values to obtain and an EAR percent response: EAR % delta T/C=Y1*Y2/100, where Y1 and Y2 are the percent delta T/C values for the single-agent treatments.

1. Combination of Compound a and Cytarabine

In experiments performed essentially as described above, the results in Tables 1A-1D are obtained for the combination of Compound A and cytarabine.

TABLE 1A

AML clearance (% hCD33 + hCD45b+ (of total white cells))

| Treatment Days | | | | | | | |
|---|---|---|---|---|---|---|---|
| A: Vehicle Control | | | | | | | |
| −3 | 28.51 | 14.42 | 21.52 | 16.63 | 17.11 | 12.94 | 23.6 |
| 18 | 56.38 | 53.74 | 48.66 | 49.96 | 61.16 | 50.02 | 55.62 |
| 34 | 59.66 | 70.73 | 74.71 | 47.74 | 59.88 | 52.14 | 56.01 |
| 47 | 85.8 | 91.96 | ND | 73.64 | 86.69 | 88.64 | 85.45 |
| 61 | ND | ND | ND | ND | ND | ND | ND |
| 75 | ND | ND | ND | ND | ND | ND | ND |
| 89 | ND | ND | ND | ND | ND | ND | ND |
| B: 3.3 mg/kg Compound A, QD, PO | | | | | | | |
| −3 | 17.5 | 23.88 | 24.18 | 19.46 | | 14.94 | 20.14 |
| 18 | 20.86 | 33.61 | 41.83 | 32.38 | 38.57 | 42.91 | 20.85 |
| 34 | 27.18 | 34.09 | 34.27 | 48.87 | 20.33 | 33.11 | 34.28 |
| 47 | 64.21 | 29.4 | 31.38 | 63.41 | 45.19 | 20.69 | 37.68 |
| 61 | 68.85 | 72.89 | 47.42 | 56.98 | 82.54 | 38.58 | 74.64 |
| 75 | 67.91 | ND | 54.26 | 56.55 | 90.69 | 45.05 | 68.73 |
| 89 | 66.75 | ND | 67.29 | 63.26 | 92.41 | 41.16 | 62.6 |
| C: 2 mg/kg Cytarabine, IP, (QDx5, rest2)X2) 14 days off)x2 | | | | | | | |
| −3 | 21.32 | 14.8 | 13.68 | 21.94 | 21.7 | 20 | 17.15 |
| 18 | 8.04 | 3.22 | 3.24 | 8.64 | 3.23 | 3.50 | 4.40 |
| 34 | 9.07 | 2.02 | 3.5 | 2.54 | 1.79 | ND | 2.04 |
| 47 | 8.25 | 8.31 | 5.29 | 4.92 | 2.29 | 4.71 | 5.51 |
| 61 | 17.63 | 29.86 | 14.99 | 42.59 | 15.49 | 29.04 | 29.58 |
| 75 | 56.57 | 60.59 | 22.85 | 59.75 | ND | 36.77 | 44.17 |
| 89 | 76.67 | 78.11 | 57.04 | 81.53 | ND | 79.57 | 68.92 |

TABLE 1A-continued

AML clearance (% hCD33 + hCD45b+ (of total white cells))

Treatment Days

| | E: 3.3 mg/kg Compound A + 2 mg/kg Cytarabine | | | | | | |
|---|---|---|---|---|---|---|---|
| −3 | 20.81 | 11.21 | 20.88 | 24.28 | 18.66 | 22.43 | 18.02 |
| 18 | 0.91 | 1.19 | 0.88 | 1.46 | 1.28 | 0.86 | 1.13 |
| 34 | 1.34 | 1.1 | 1.61 | 0.97 | 0.87 | 0.8 | 0.6 |
| 47 | 0.97 | 0.33 | 0.82 | 0.48 | 0.58 | 0.4 | 0.2 |
| 61 | 1.93 | 0.26 | 0.65 | 0.33 | 0.4 | 0.22 | 0.39 |
| 75 | 10.37 | 0.89 | 1.38 | 1.44 | 1.09 | 1.08 | 1.2 |
| 89 | 10.68 | 7.39 | 3.63 | 12.52 | 8.75 | 5.09 | 9.89 |

Each column is data from one animal.

At day 47, for each respective treatment group, the % plasma AML, cells is: A: vehicle (86%); B: Compound A (39%); C: cytarabine (5.2%); and E: Compound A+cytarabine (0.48%) ($p<0.001$).

TABLE 1B

AML cell differentiation (% hCD33 + hCD11b+ (of hCD45+ cells))

Treatment Days

| | A: Vehicle Control | | | | | | |
|---|---|---|---|---|---|---|---|
| −3 | 13.38 | 16.28 | 18.13 | 13.87 | 14.99 | 11.74 | 11.6 |
| 18 | 13.02 | 12.85 | 8.29 | 9.35 | 14.10 | 11.42 | 16.30 |
| 34 | 12.45 | 12.57 | 12.47 | 10.54 | 15.6 | 12.01 | 13.58 |
| 47 | 10.67 | 12.15 | ND | 11.01 | 11.32 | 7.82 | 6.1 |
| 61 | ND | ND | ND | ND | ND | ND | ND |
| 75 | ND | ND | ND | ND | ND | ND | ND |
| 89 | ND | ND | ND | ND | ND | ND | ND |
| | B: 3.3 mg/kg Compound A, QD, PO | | | | | | |
| −3 | 11.93 | 12 | 13.59 | 13.22 | | 11.07 | 13.07 |
| 18 | 23.96 | 27.78 | 22.27 | 22.38 | 22.41 | 29.38 | 24.62 |
| 34 | 30.68 | 27.59 | 29.94 | 25.81 | 29.79 | 34.39 | 29.26 |
| 47 | 37.61 | 35.31 | 38.58 | 39.61 | 31.81 | 41.02 | 35.79 |
| 61 | 37.61 | 40.23 | 40.06 | 33.82 | 32.55 | 43.95 | 44 |
| 75 | 33.98 | ND | 35.9 | 31.38 | 37.53 | 34.66 | 51.92 |
| 89 | 21.32 | | 43.96 | 40.34 | 28.57 | 37.17 | 45.68 |
| | C: 2 mg/kg Cytarabine, IP, (QDx5, rest2)X2) 14 days off)x2 | | | | | | |
| −3 | 16.46 | 20.43 | 14.95 | 8.62 | 13.39 | 10.09 | 12.17 |
| 18 | 15.93 | 18.69 | 13.00 | 11.66 | 14.07 | 10.70 | 11.81 |
| 34 | 37.13 | 33.07 | 31.02 | 31.17 | 33.03 | ND | 37.1 |
| 47 | 8.3 | 7.84 | 7.69 | 5.82 | 16.79 | 5.09 | 7.21 |
| 61 | 9.5 | 8.65 | 9.29 | 6.94 | 10.6 | 7.78 | 8.46 |
| 75 | 5.65 | 7.65 | 11.09 | 11.48 | ND | 10 | 10.46 |
| 89 | 8.75 | 10.17 | 8.87 | 18.02 | ND | 12.49 | 11.08 |
| | E: 3.3 mg/kg Compound A + 2 mg/kg Cytarabine | | | | | | |
| −3 | 13.16 | 11.76 | 15.11 | 12.6 | 11.18 | 9.52 | 15.03 |
| 18 | 40.35 | 44.05 | 46.15 | 27.47 | 35.44 | 46.30 | 49.32 |
| 34 | 69.05 | 72.97 | 73.74 | 72.31 | 61.4 | 70 | 67.57 |
| 47 | 71.93 | 77.78 | 70.83 | 72.41 | 62.16 | 60 | 76.92 |
| 61 | 74.24 | 35.85 | 40.91 | 35.42 | 30.65 | 17.31 | 26.15 |
| 75 | 84.38 | 18.52 | 48.44 | 36 | 45.78 | 28.57 | 31.82 |
| 89 | 60.42 | 46.4 | 48.59 | 49.39 | 49.13 | 39.89 | 48.48 |

Each column is data from one animal.

At day 47, for each respective treatment group, the % AML, cell differentiation is: A: vehicle (10%); B: Compound A (37%); C: cytarabine (8%); and E: Compound A+cytarabine (71%) ($p<0.001$).

TABLE 1C

Bone Marrow AML Clearance

| Treatment Group | % hCD33 + hCD45+ (% of white cells) | % hCD45+ (% of white cells) |
|---|---|---|
| I: Naïve (Non-Tumor) | 0.03 | 0.09 |
| A: Vehicle Control | 96.16 | 96.13 |
|  | 97.02 | 96.97 |
|  | 87.12 | 87.23 |
|  | 94.5 | 94.23 |
| B: 3.3 mg/kg Compound A, QD, PO | 98.6 | 98.36 |
|  | 44.3 | 43.99 |
|  | 98.54 | 98.15 |
|  | 86.55 | 86.21 |
| C: 2 mg/kg Cytarabine, IP, (QDx5, rest2)X2) 14 days off) × 2 | 64.38 | 71.88 |
|  | 75.48 | 78.06 |
|  | 39.66 | 44.54 |
|  | 80.32 | 80.75 |
| E: 3.3 mg/kg Compound A + 2 mg/kg Cytarabine | 11.51 | 11.53 |
|  | 9.69 | 9.57 |
|  | 20.23 | 20.72 |
|  | 17.99 | 17.97 |

For each respective treatment group, the % bone marrow AML clearance is: A: vehicle (94%); B: Compound A (78%); C: cytarabine (63%); and Compound A+cytarabine (14%) (p=0.0011).

TABLE 1D

Plasma 2-HG Inhibition

| Treatment Group | 2-HG (uM) | Naive Subtracted 2-HG (uM) | % Inhibition of 2-HG |
|---|---|---|---|
| A: Vehicle Control | 7.714 | 6.806 | 38.677 |
|  | 18.636 | 17.728 | −59.73 |
|  | 11.329 | 10.42 | 6.112 |
|  | 11.441 | 10.533 | 5.098 |
|  | 11.187 | 10.279 | 7.385 |
|  | 10.112 | 9.204 | 17.073 |
|  | 13.629 | 12.721 | −14.616 |
| B: 3.3 mg/kg Compound A, QD, PO | 1.042 | 0.134 | 98.792 |
|  | 1.717 | 0.809 | 92.715 |
|  | 1.206 | 0.298 | 97.316 |
|  | 0.885 | −0.023 | 100.207 |
|  | 0.924 | 0.016 | 99.855 |
|  | 1.708 | 0.799 | 92.797 |
|  | 1.488 | 0.579 | 94.779 |
| C: 2 mg/kg Cytarabine, IP, (QDx5, rest2)X2) 14 days off)x2 | 3.256 | 2.348 | 78.844 |
|  | 4.42 | 3.512 | 68.361 |
|  | 2.131 | 1.223 | 88.982 |
|  | 3.154 | 2.246 | 79.768 |
|  | 4.051 | 3.143 | 71.68 |
|  | 3.496 | 2.588 | 76.685 |
|  | 4.423 | 3.515 | 68.331 |
| E: 3.3 mg/kg Compound A + 2 mg/kg Cytarabine | 2.109 | 1.201 | 89.181 |
|  | 2.95 | 2.041 | 81.609 |
|  | 1.573 | 0.665 | 94.011 |
|  | 1.297 | 0.388 | 96.5 |
|  | 3.158 | 2.25 | 79.73 |
|  | 2.799 | 1.891 | 82.962 |
|  | 1.124 | 0.216 | 98.056 |

For each respective treatment group, the % plasma 2-HG is: A: vehicle (100%); B: Compound A (3.4%); C: cytarabine (24%); and E: Compound A+cytarabine (11%) (p=0.0004).

In conclusion, the combination of Compound A and cytarabine enhances the suppression of AML, in both the bone marrow and the periphery.

2. Combination of Compound A and Azacitidine

In experiments performed essentially as described above, the results in Tables 2A-2D are obtained for the combination of Compound A and azacitidine.

TABLE 2A

AML clearance (% hCD33 + hCD45b+ (of total white cells)

| Treatment Days | | | | | | | |
|---|---|---|---|---|---|---|---|
| *A: Vehicle Control* | | | | | | | |
| −19 | 5.05 | 4.28 | 6.34 | 3.92 | 4.14 | 3.72 | 3.02 |
| 2 | 16.5 | 29.51 | 19.54 | 16.31 | 14 | 15.84 | 19.3 |
| 15 | 32.49 | 55.55 | 43.4 | 46.47 | 34.76 | 48.34 | 28.08 |
| 28 | 60.98 | 50.61 | 52.34 | 55.71 | 52.39 | 55.66 | 20.12 |
| 43 | 85.2 | 76.4 | 84.57 | 77.66 | 56.65 | 62.28 | 58.32 |
| 58 | ND | ND | ND | ND | ND | ND | ND |
| 77 | ND | ND | ND | ND | ND | ND | ND |
| 98 | ND | ND | ND | ND | ND | ND | ND |
| *B: 3.3 mg/kg Compound A, QD, PO* | | | | | | | |
| −19 | 6.86 | 3.77 | 4.41 | 2.93 | 5.26 | 4.84 | 2.39 |
| 2 | 17.05 | 19.48 | 22.89 | 20.16 | 18.6 | 25.83 | 19.49 |
| 15 | 35.68 | 39.36 | 39.41 | 22.01 | 44.8 | 40.7 | 29.24 |
| 28 | 32.12 |  | 43.09 | 32.66 | 35.22 | 35 | 33.35 |
| 43 | 59.89 | 65.62 | 61.99 | 47.87 | 52.96 | 62.25 | 27.91 |
| 58 | 67.45 | 59.45 | 67.73 | 53.95 | 44.7 | 48.88 | 71.52 |
| 77 | 74.81 | 79.27 | ND | 43.75 | 60.02 | 75.38 | 59.74 |
| 98 | 55.63 | 73.72 | ND | ND | 73.42 | 85.43 | 64.03 |
| *G: 1 mg/kg Azacitidine, (QDx5, rest2)X2, 14 days off* | | | | | | | |
| −19 | 7.65 | 4.33 | 3.14 | 6.28 | 3.24 | 2.46 | 2.87 |
| 2 | 23.43 | 20.98 | 19.8 | 15.03 | 22.26 | 10.88 | 16.63 |
| 15 | 33.19 | 44.55 | 30.95 | 35.67 | 30.39 | 28.23 | 30.75 |
| 28 | 13.99 | 12.05 | 15.33 | 16.77 | 13.73 | 22.64 | 22.81 |
| 43 | 32.23 | 23.27 | 18.57 | 27.48 | 11.38 | 25.34 | 20.44 |
| 58 | ND | 11.92 | 32.12 | 11.16 | 7.63 | 9.47 | 13.4 |

TABLE 2A-continued

| AML clearance (% hCD33 + hCD45b+ (of total white cells)) | | | | | | | |
|---|---|---|---|---|---|---|---|
| Treatment Days | | | | | | | |
| 77 | ND | 12.91 | 26.37 | 20.18 | 12.58 | 15.11 | 11.64 |
| 98 | ND | 62.54 | 70.18 | 65.61 | 37.53 | | 38.23 |
| H: 3.3 mg/kg Compound A QD + 1 mg/kg Azacitidine | | | | | | | |
| −19 | 4.33 | 2.76 | 3.31 | 2.24 | 4.31 | 6.38 | 3.84 |
| 2 | 19.98 | 14.18 | 10.28 | 15.76 | 28.42 | 16.97 | 13.17 |
| 15 | 23.66 | 15.37 | 23.22 | 31.07 | 27.55 | 26.83 | 25.81 |
| 28 | 6.31 | 5.5 | 7.26 | 5.73 | 4.28 | 6.49 | 7.29 |
| 43 | 17.1 | 11.53 | 12.68 | 9.76 | 3.99 | 9.82 | 8.28 |
| 58 | 11.81 | 9.84 | 7.52 | 5.81 | 5.09 | 9.5 | 7.81 |
| 77 | 19.08 | 7.56 | 7.18 | 13.44 | 7.25 | 17.29 | 10.56 |
| 98 | 34.42 | 21.66 | 14.1 | 21.85 | 13.55 | 21.89 | 19.04 |

Each column is data from one animal.

At day 43, for each respective treatment group, the % plasma AML, cells is: A: vehicle (71%); B: Compound A (52%); G: azacitidine (22%); and H: Compound A+azacitidine (9.7%) (p<0.023).

TABLE 2B

| AML cell differentiation (% hCD33 + hCD11b+ (of hCD45+ cells)) | | | | | | | |
|---|---|---|---|---|---|---|---|
| Treatment Days | | | | | | | |
| A: Vehicle Control | | | | | | | |
| −19 | 0.65 | 1.54 | 1.58 | 0.84 | 2.4 | 0.9 | 2.25 |
| 2 | 12.96 | 11.83 | 12.77 | 16.62 | 8.2 | 14.12 | 9 |
| 15 | 16.18 | 21.86 | 16.82 | 22.7 | 19.61 | 20.66 | 17.46 |
| 28 | 17.51 | 14.19 | 17.58 | 15.57 | 15.29 | 14.62 | 9.19 |
| 43 | 15.41 | 20.79 | 13.79 | 17.18 | 13.07 | 12.15 | 13.56 |
| 58 | ND | ND | ND | ND | ND | ND | ND |
| 77 | ND | ND | ND | ND | ND | ND | ND |
| 98 | ND | ND | ND | ND | ND | ND | ND |
| B: 3.3 mg/kg Compound A, QD, PO | | | | | | | |
| −19 | 1.45 | 2.19 | 0.38 | 2.21 | 0.64 | 0.34 | 0.68 |
| 2 | 14.12 | 16.05 | 13.27 | 10.34 | 11.59 | 13.32 | 14.01 |
| 15 | 33.42 | 27.78 | 36.01 | 28.02 | 28.21 | 29.24 | 33.82 |
| 28 | 35.79 | | 36.46 | 33.59 | 39.91 | 37.16 | 40.47 |
| 43 | 37.51 | 35.22 | 33.33 | 36.61 | 41.32 | 33.68 | 39.34 |
| 58 | 42.9 | 44.03 | 33.47 | 48.08 | 47.13 | 40.2 | 26.62 |
| 77 | 56.29 | 46.83 | ND | 42.98 | 48.3 | 51.69 | 48.56 |
| 98 | 44.09 | 47.66 | ND | | 33.67 | 36.45 | 33.6 |
| G: 1 mg/kg Azacitidine, (QDx5, rest 2)X2, 14 days off | | | | | | | |
| −19 | 1.53 | 0 | 2.59 | 0.27 | 0 | 2.72 | 1.16 |
| 2 | 10.07 | 14.27 | 13.08 | 12.37 | 5.55 | 9.38 | 9.55 |
| 15 | 12.12 | 16.08 | 11.64 | 18.36 | 13.75 | 11.72 | 18.15 |
| 28 | 21.14 | 21.62 | 19.07 | 20.9 | 16.95 | 20.64 | 21.18 |
| 43 | 10.64 | 9.94 | 11.58 | 6.98 | 6.67 | 12.03 | 10.48 |
| 58 | | 14.45 | 9.99 | 10.78 | 11.33 | 11.72 | 13.55 |
| 77 | | 10.12 | 10.78 | 8.78 | 6.76 | 10.92 | 11.76 |
| 98 | | 10.31 | 14.59 | 17.5 | 8.29 | ND | 16.64 |
| H: 3.3 mg/kg Compound A QD + 1 mg/kg Azacitidine | | | | | | | |
| −19 | 1.89 | 0 | 1.98 | 1.48 | 1.15 | 2.36 | 1.72 |
| 2 | 13.61 | 13.16 | 12.2 | 9.95 | 13.66 | 14.2 | 17.39 |
| 15 | 36.90 | 35.00 | 39.11 | 28.42 | 34.76 | 36.92 | 41.66 |
| 28 | 67.13 | 60.83 | 56.32 | 56.89 | 62.35 | 64.41 | 68.63 |
| 43 | 59.57 | 54.06 | 60.8 | 68.12 | 53.56 | 58.1 | 53.95 |
| 58 | 61.38 | 71.75 | 60.91 | 68.19 | 64.34 | 64.74 | 55.81 |
| 77 | 59.55 | 61.55 | 63.79 | 62.29 | 58.76 | 45.38 | 57.96 |
| 98 | 57.86 | 60.39 | 66.97 | 64.17 | 54.5 | 47.71 | 56.11 |

Each column is data from one animal.

At day 43, for each respective treatment group, the % AML, cell differentiation is: A: vehicle (15%); B: Compound A (37%); G: azacitidine (10%); and H: Compound A+azacitidine (59%) (p<0.001).

TABLE 2C

Bone Marrow AML Clearance

| Treatment Group | % hCD33 + hCD45+ (% of white cells) | % hCD45+ (% of white cells) |
|---|---|---|
| I: Naïve (Non-Tumor) | 0.03 | 0.09 |
|  | 0 | 0.03 |
| A: Vehicle Control | 89.98 | 89.95 |
|  | 97.76 | 97.61 |
|  | 98.53 | 98.36 |
|  | 88.68 | 88.66 |
|  | 97.56 | 97.49 |
| B: 3.3 mg/kg Compound A, QD, PO | 72.73 | 72.6 |
|  | 84.3 | 84.16 |
|  | 99.41 | 99.3 |
|  | 91.97 | 91.11 |
| G: 1 mg/kg Azacitidine, (QD × 5, rest 2)x2, 14 days off | 49.81 | 49.85 |
|  | 60.61 | 61 |
|  | 72.4 | 72.52 |
|  | 43.12 | 43.15 |
| H: 3.3 mg/kg Compound A QD + 1 mg/kg Azacitidine | 36.77 | 36.23 |
|  | 15.91 | 15.57 |
|  | 20.45 | 20.21 |
|  | 10.57 | 10.32 |

For each respective treatment group, the % bone marrow AML clearance is: A: vehicle (94%); B: Compound A (87%); G: azacitidine (55%); and H: Compound A+azacitidine (19%) (p=0.0032).

TABLE 2D

Plasma 2-HG Inhibition

| Treatment Group | 2-HG (μM) | Naive Subtracted 2-HG (μM) | % Inhibition of 2-HG |
|---|---|---|---|
| A: Vehicle Control | 8.25 | 5.314 | 22.555 |
|  | 10.67 | 7.733 | -12.702 |
|  | 9.426 | 6.489 | 5.426 |
|  | 12.054 | 9.118 | -32.879 |
|  | 11.571 | 8.635 | -25.843 |
|  | 11.39 | 8.454 | -23.204 |
| G: 3.3 mg/kg Compound A, QD, PO | 5.225 | 2.289 | 66.648 |
|  | 1.701 | -1.236 | 118.011 |
|  | 3.072 | 0.135 | 98.032 |
|  | 2.049 | -0.888 | 112.937 |
|  | 1.022 | -1.915 | 127.909 |
|  | 1.374 | -1.562 | 122.77 |
|  | 1.654 | -1.282 | 118.689 |
|  | 2.13 | -0.807 | 111.758 |
| H: 1 mg/kg Azacitidine, IP, (QDx5, rest 2)x2 14 days off | 7.539 | 4.603 | 32.923 |
|  | 8.241 | 5.305 | 22.691 |
|  | 5.896 | 2.959 | 56.872 |
|  | 6.243 | 3.307 | 51.81 |
|  | 4.624 | 1.688 | 75.405 |
|  | 4.775 | 1.838 | 73.207 |
|  | 6.422 | 3.486 | 49.201 |
| E: 3.3 mg/kg Compound A + 1 mg/kg Azacitidine | 1.883 | -1.054 | 115.358 |
|  | 5.298 | 2.362 | 65.58 |
|  | 1.379 | -1.557 | 122.695 |
|  | 1.189 | -1.748 | 125.47 |
|  | 1.602 | -1.335 | 119.455 |
|  | 2.97 | 0.033 | 99.516 |
|  | 1.617 | -1.32 | 119.232 |

For each respective treatment group, the % plasma 2-HG is: A: vehicle (100%); B: Compound A (-15%); G: azacitidine (48%); and H: Compound A+azacitidine (-9.6%) (p=0.1714).

In conclusion, the combination of Compound A and azacitidine enhances the suppression of AML, in both the bone marrow and the periphery.

3. Combination of Compound A and Midostaurin

In experiments performed essentially as described above, the results in Tables 3A-3D are obtained for the combination of Compound A and midostaurin.

TABLE 3A

AML clearance (% hCD33 + hCD45+ (of total white cells))

| Treatment Days | A: Vehicle Control | | | | |
|---|---|---|---|---|---|
| -8 | 4.5 | 13.37 | 3.12 | 2.61 | ND |
| 7 | 12.69 | 13.35 | 10.56 | 9.63 | 10.37 |
| 23 | 13.28 | 12.69 | 7.7 | 6.86 | 12.29 |
| 36 | 9.83 | 17.67 | 7.33 | 16.95 | 33.9 |
| 50 | 15.43 | 48.08 | 29.91 | 34.55 | 44.72 |
| 64 | 44.51 | ND | ND | 74.79 | 71.09 |
| 78 | 90.36 | ND | ND | ND | ND |
| 84 | 94.63 | ND | ND | ND | ND |
| 92 | ND | ND | ND | ND | ND |

| Treatment Days | B: 1 mg/kg Compound A, QD, PO | | | | |
|---|---|---|---|---|---|
| -8 | 6.97 | 3.7 | 3.2 | 7.02 | 11.07 |
| 7 | 12.21 | 7.04 | 6.97 | 8.4 | 10.28 |
| 23 | 16.54 | 9.05 | ND | 15.88 | 9.45 |
| 36 | 16.96 | 20.94 | ND | 15.66 | 13.65 |
| 50 | 26.13 | 48.71 | ND | 41.07 | 42.54 |
| 64 | 51.67 | 57.72 | ND | 55.61 | 45.53 |
| 78 | 65.17 | 75.95 | ND | 68.32 | 56.56 |
| 84 | 98.27 | ND | ND | ND | 84.52 |
| 92 | ND | ND | ND | ND | ND |

| Treatment Days | C: 10 mg/kg Compound A, QD, PO | | | | |
|---|---|---|---|---|---|
| -8 | 2.43 | 7.61 | 4.1 | 6.27 | 6.53 |
| 7 | 4.04 | 3.35 | 6.37 | 4.2 | 2.73 |
| 23 | 4.97 | 1.6 | 8.52 | 2.88 | 2.41 |
| 36 | 4.67 | 3.89 | 4.32 | 2.11 | 2.39 |
| 50 | 2.9 | 3.66 | 5.08 | 2.11 | 1.55 |
| 64 | 0.94 | 1.66 | 1.11 | 1.55 | 0.62 |
| 78 | 0.89 | 1.72 | 0.4 | 0.45 | 0.46 |
| 84 | ND | ND | ND | ND | ND |
| 92 | 0.8 | 2.36 | 0.4 | 0.19 | 0.32 |

| Treatment Days | F: 50 mg/kg Midostaurin, QD, PO | | | | |
|---|---|---|---|---|---|
| -8 | 7.94 | 8.17 |  | 6.23 | 2.27 |
| 7 | 10.05 | 3.62 | 8.05 | 11.35 | 2.53 |
| 23 | 6.24 | 3.75 | 7.09 | 2.63 | 0.84 |
| 36 | 3.7 | 1.83 | 4.68 | 2.15 | 0.28 |
| 50 | 2.21 | 0.76 | 3.72 | 1.29 | 0.21 |
| 64 | 7.01 | 2.16 | 3.93 | 4.84 | 0.18 |
| 78 | 18.03 | 2.94 | 8.24 | 14.27 | 0.14 |
| 84 | ND | ND | ND | ND | ND |
| 92 | 35.38 | 4.09 | 14.55 | 30.48 | 0.86 |

| Treatment Days | I: 1 mg/kg Compound A + 50 mg/kg Midostaurin | | | | |
|---|---|---|---|---|---|
| -8 |  | 8.35 | 9.2 | 7.2 | 12.53 |
| 7 | 9.95 | 6.41 | 7.99 | 7.26 | 9.1 |
| 23 | 2.47 | 3.87 | 4.96 | 4.68 | 5.54 |
| 36 | 3.72 | 2.88 | 5.36 | 5.82 | 4.78 |
| 50 | 4.67 | 1.67 | 1.97 | 2.27 | 1.5 |
| 64 | 7.26 | 1.1 | 0.79 | 0.62 | 1.02 |
| 78 | 5.67 | 2.82 | 1.36 | 0.37 | 1.36 |
| 84 | ND | ND | ND | ND | ND |
| 92 | 3.52 | 3.73 | 1.55 | 0.78 | 2.06 |

| Treatment Days | L: 10 mg/kg Compound A + 50 mg/kg Midostaurin | | | | |
|---|---|---|---|---|---|
| -8 | 3.21 | 4.02 | 5.9 | 5.19 |  |
| 7 | 5.44 | 3.71 | 5.65 | 3.23 | 7.26 |
| 23 | 5.1 | 3.97 | 1.58 | 2.76 | 2.45 |
| 36 | 2.55 | 1.5 | 0.89 | 1.67 | 1.31 |
| 50 | ND | 0.47 | 0.39 | 1.11 | 0.41 |
| 64 | ND | 0.16 | 0.77 | 0.66 | 0.9 |
| 78 | ND | ND | 0.26 | 0.48 | 0.28 |
| 84 | ND | ND | ND | ND | ND |
| 92 |  | 0.02 | 0.3 | 0.41 | 0.49 |

Each column is data from one animal.

At day 50, for each respective treatment group, the % plasma AML, cells is: A: vehicle (32%); B: 1 mg Compound A (37%); F: midostaurin (1.1%); and I: 1 mg Compound A+midostaurin (2.2%) (p=0.473).

At day 50, for each respective treatment group, the % plasma AML cells is: A: vehicle (32%); C: 10 mg Compound A (2.8%); F: midostaurin (1.1%); and L: 10 mg Compound A+midostaurin (0.6%) (p=0.016).

At day 64, for each respective treatment group, the % plasma AML cells is: A: vehicle (67%); B: 1 mg Compound A (51%); F: midostaurin (2.2%); and I: 1 mg Compound A+midostaurin (1.3%) (p=0.767).

At day 64, for each respective treatment group, the % plasma AML cells is: A: vehicle (67%); C: 10 mg Compound A (1.1%); F: midostaurin (2.2%); and L: 10 mg Compound A+midostaurin (0.56%) (p<0.001).

At day 78, for each respective treatment group, the % plasma AML cells is: A: vehicle (129%); B: 1 mg Compound A (65%); F: midostaurin (3.9%); and I: 1 mg Compound A+midostaurin (1.6%) (p=0.829).

At day 78, for each respective treatment group, the % plasma AML, cells is: A: vehicle (129%); C: 10 mg Compound A (0.66%); F: midostaurin (3.9%); and L: 10 mg Compound A+midostaurin (0.25%) (p<0.001).

TABLE 3B

AML cell differentiation (% hCD33 + hCD11b+ (of hCD45+ cells))

| Treatment Days | A: Vehicle Control, QD, PO | | | | |
| --- | --- | --- | --- | --- | --- |
| −8 | 22.44 | 21.66 | 26.02 | 23.22 | ND |
| 7 | 18.12 | 25.32 | 17.42 | 14.82 | 11.49 |
| 23 | 27.28 | 34.92 | 34.06 | 31.95 | 18.48 |
| 36 | 21.05 | 23.41 | 29.15 | 18.71 | 14.51 |
| 50 | 28.27 | 22.95 | 35.27 | 27.87 | 26.53 |

| Treatment Days | B: 1 mg/kg Compound A, QD, PO | | | | |
| --- | --- | --- | --- | --- | --- |
| −8 | 19.01 | 16.75 | 18.21 | 15.94 | 14.64 |
| 7 | 24.79 | 18.62 | 18.4 | 20.43 | 22.79 |
| 23 | 57.17 | 53.16 | ND | 47.84 | 49.9 |
| 36 | 48.72 | 38.84 | ND | 42.4 | 42.69 |
| 50 | 46.97 | 50.22 | ND | 37.55 | 38.56 |

| Treatment Days | C: 10 mg/kg Compound A, QD, PO | | | | |
| --- | --- | --- | --- | --- | --- |
| −8 | 22.89 | 20.16 | 18.9 | 18.51 | 23.52 |
| 7 | 28.5 | 44.67 | 21.82 | 37.68 | 30.22 |
| 23 | 66.4 | 65.68 | 78.04 | 75.09 | 68.25 |
| 36 | 76.97 | 73.58 | 78 | 69.41 | 81.2 |
| 50 | 78.52 | 72.99 | 88.65 | 77.31 | 73.29 |

| Treatment Days | F: 50 mg/kg Midostaurin, QD, PO | | | | |
| --- | --- | --- | --- | --- | --- |
| −8 | 19.58 | 13.81 | ND | 18.12 | 19.57 |
| 7 | 25.48 | 12.53 | 9 | 38.3 | 27.14 |
| 23 | 25.27 | 17.13 | 9.1 | 36.3 | 25.56 |
| 36 | 45.81 | 34.03 | 21.16 | 47.53 | 25.64 |
| 50 | 43.86 | 28.75 | 20.78 | 40 | 30.3 |

| Treatment Days | I: 1 mg/kg Compound A + 50 mg/kg Midostaurin | | | | |
| --- | --- | --- | --- | --- | --- |
| −8 | ND | 27.16 | 14.82 | 13.64 | 15.56 |
| 7 | 6.19 | 35.53 | 38.62 | 26.25 | 35.64 |
| 23 | 21.9 | 47.38 | 57.06 | 49.79 | 49.38 |
| 36 | 73.19 | 75.68 | 75.81 | 75.25 | 71.95 |
| 50 | 82.4 | 81.67 | 81.4 | 78.57 | 83.12 |

| Treatment Days | L: 10 mg/kg Compound A + 50 mg/kg Midostaurin | | | | |
| --- | --- | --- | --- | --- | --- |
| −8 | 22.32 | 23.13 | 15.11 | 13.9 | ND |
| 7 | 31.82 | 20.84 | 44.46 | 27.84 | 7.91 |

TABLE 3B-continued

AML cell differentiation (% hCD33 + hCD11b+ (of hCD45+ cells))

| 23 | 60.18 | 56.54 | 51.23 | 46.59 | 57.2 |
| --- | --- | --- | --- | --- | --- |
| 36 | 74.62 | 76.43 | 71 | 76.16 | 75.97 |
| 50 | ND | 83.67 | 79.55 | 65.22 | 85.37 |

Each column is data from one animal.

At day 50, for each respective treatment group, the % AML, cell differentiation is: A: vehicle (28%); B: 1 mg Compound A (43%); F: midostaurin (33%); and I: 1 mg Compound A+midostaurin (81%) (p<0.001).

At day 50, for each respective treatment group, the % AML cell differentiation is: A: vehicle (28%); C: 10 mg Compound A (79%); F: midostaurin (33%); and L: 10 mg Compound A+midostaurin (80%) (p 0.776).

TABLE 3C

Bone Marrow AML Clearance

| Treatment Group | % hCD33 + hCD45+ (% of white cells) | % hCD45+ (% of white cells) |
| --- | --- | --- |
| A: Vehicle Control, QD, PO | 88.33 | 88.33 |
| | 83.21 | 84.57 |
| B: 1 mg/kg Compound A, QD, PO | 87.74 | 88.34 |
| | 92.23 | 92.36 |
| C: 10 mg/kg Compound A, QD, PO | 8.65 | 8.66 |
| | 4.27 | 4.28 |
| | 1.09 | 1.11 |
| | 0.78 | 0.78 |
| | 1.84 | 1.85 |
| F: 50 mg/kg Midostaurin, QD, PO | 51.84 | 51.3 |
| | 6.3 | 6.25 |
| | 22.34 | 22.22 |
| | 59.24 | 58.42 |
| | 25.84 | 25.71 |
| I: 1 mg/kg Compound A + 50 mg/kg Midostaurin | 26.83 | 26.89 |
| | 69.53 | 69.55 |
| | 48.59 | 48.57 |
| | 4.78 | 4.77 |
| | 6.7 | 6.72 |
| L: 10 mg/kg Compound A + 50 mg/kg Midostaurin | 0.02 | 0.05 |
| | 1.38 | 1.5 |
| | 1.17 | 1.32 |
| | 0.88 | 1.13 |

For each respective treatment group, the % bone marrow AML clearance is: A: vehicle (86%); B: 1 mg Compound A (90%); F: midostaurin (26%); and I: 1 mg Compound A+midostaurin (19%) (p=0.828).

For each respective treatment group, the % bone marrow AML clearance is: A: vehicle (86%); C: 10 mg Compound A (2.3%); F: midostaurin (26%); and L: 1 mg Compound A+midostaurin (0.58%) (p=0.906).

TABLE 3D

Plasma 2-HG Inhibition

| Treatment Group | 2-HG (μM) | Naive Subtracted 2-HG (μM) | % Inhibition of 2-HG |
| --- | --- | --- | --- |
| A: Vehicle Control QD, PO | 16.715 | 14.306 | 5.381 |
| | 18.567 | 16.158 | −6.87 |
| | 18.538 | 16.129 | −6.679 |
| | 16.293 | 13.884 | 8.168 |
| B: 1 mg/kg Compound A, QD, PO | 9.264 | 6.855 | 54.663 |
| | 6.489 | 4.08 | 73.015 |
| | 7.318 | 4.909 | 67.532 |

TABLE 3D-continued

Plasma 2-HG Inhibition

| Treatment Group | 2-HG (μM) | Naive Subtracted 2-HG (μM) | % Inhibition of 2-HG |
| --- | --- | --- | --- |
| | 8.683 | 6.274 | 58.504 |
| | 8.938 | 6.529 | 56.818 |
| C: 10 mg/kg Compound A | 4.821 | 2.412 | 84.049 |
| | 4.395 | 1.986 | 86.867 |
| | 4.286 | 1.877 | 87.584 |
| | 3.033 | 0.624 | 95.874 |
| | 2.863 | 0.454 | 97 |
| F: 50 mg/kg Midostaurin, | 14.919 | 12.51 | 17.254 |
| QD, PO | 11.402 | 8.993 | 40.521 |
| | 7.494 | 5.085 | 66.37 |
| | 21.55 | 19.141 | −26.601 |
| | 10.075 | 7.666 | 49.298 |
| I: 1 mg/kg Compound A + | 7.592 | 5.183 | 65.72 |
| 50 mg/kg Midostaurin | 3.872 | 1.463 | 90.325 |
| | 4.964 | 2.555 | 83.099 |
| | 4.405 | 1.996 | 86.799 |
| | 6.924 | 4.515 | 70.135 |
| L: 10 mg/kg Compound A + | 2.011 | −0.398 | 102.635 |
| 50 mg/kg Midostaurin | 3.914 | 1.505 | 90.046 |
| | 2.572 | 0.163 | 98.924 |
| | 2.728 | 0.319 | 97.888 |
| | 6.005 | 3.596 | 76.217 |

For each respective treatment group, the % plasma 2-HG is: A: vehicle (100%); B: 1 mg Compound A (38%); F: midostaurin (70%); and I: 1 mg Compound A+midostaurin (21%) (p=0.789).

For each respective treatment group, the % plasma 2-HG is: A: vehicle (100%); C: 10 mg Compound A (9.2%); F: midostaurin (70%); and L: 10 mg Compound A+10 mg midostaurin (6.8%) (p=0.373).

In conclusion, the combination of Compound A and midostaurin enhances the suppression of AML, in both the bone marrow and the periphery.

We claim:

1. A method for treating cancer in a human cancer subject having an isocitrate dehydrogenase (IDH) mutation, wherein the method comprises administering to the human cancer subject having an isocitrate dehydrogenase (IDH) mutation a therapeutically effective amount of:
   (a) a first compound of the Formula I:

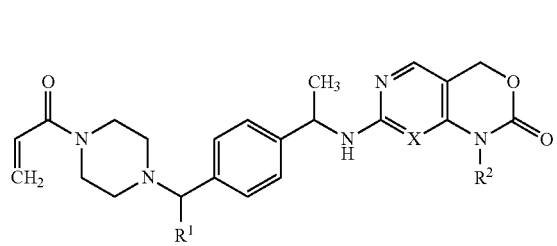

or a pharmaceutically acceptable salt or stereoisomer thereof,
wherein:
$R^1$ is $CH_2$-cyclopropyl, $CH_2CH_3$, $CH_2CH_2OCH_3$, or $CH_2CH(CH_3)_2$;
$R^2$ is $CH_3$ or $CH_2CH_3$; and
X is CH or N; and
(b) at least one second compound selected from the group consisting of:

(i) an antimetabolite agent, or a pharmaceutically acceptable salt thereof;
(ii) a hypomethylating agent, or a pharmaceutically acceptable salt of thereof; and
(iii) a mutant Fms-like tyrosine kinase 3 (Flt3) inhibitor, or a pharmaceutically acceptable salt thereof,
or a combination thereof.

2. The method of claim 1, wherein the cancer is a hematologic malignancy.

3. The method of claim 2, wherein the hematologic malignancy is selected from the group consisting of acute myelogenous leukemia, angioimmunoblastic T-cell lymphoma, chronic myelogenous leukemia, essential thrombocythemia, a myeloproliferative neoplasm, a myelodysplastic syndrome, primary myelofibrosis, T-cell acute lymphoblastic leukemia, and polycythemia vera.

4. The method of claim 3, wherein the hematologic malignancy is acute myelogenous leukemia.

5. The method of claim 1, wherein the cancer is a solid tumor cancer.

6. The method of claim 5, wherein the solid tumor cancer is selected from the group consisting of astrocytoma, bladder carcinoma, cholangiocarcinoma, chondrosarcoma, colorectal cancer, glioblastoma, glioma, head and neck cancer, hepatocellular carcinoma, lung cancer, melanoma, oligodendroglioma, pancreatic cancer, and sinonasal undifferentiated carcinoma.

7. The method of claim 6, wherein the solid tumor cancer is cholangiocarcinoma.

8. The method of claim 1, wherein the isocitrate dehydrogenase (IDH) mutation is an isocitrate dehydrogenase 1 (IDH1) mutation.

9. The method of claim 8, wherein the isocitrate dehydrogenase 1 (IDH1) mutation is an isocitrate dehydrogenase 1 (IDH1) R132 mutation.

10. The method of claim 1, wherein the isocitrate dehydrogenase (IDH) mutation is an isocitrate dehydrogenase 2 (IDH2) mutation.

11. The method of claim 10, wherein the isocitrate dehydrogenase 2 (IDH2) mutation is an isocitrate dehydrogenase 2 (IDH2) R172 mutation.

12. The method of claim 1, wherein X is N.

13. The method of claim 1, wherein:
$R^1$ is $CH_2$-cyclopropyl;
$R^2$ is $CH_2CH_3$; and
X is N.

14. The method of claim 1, wherein the first compound is:

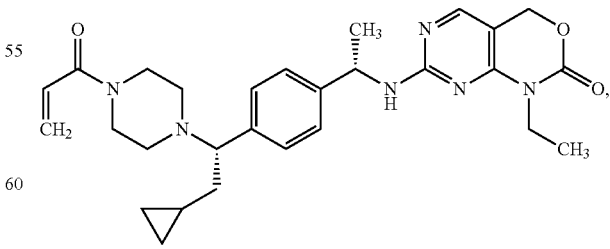

or a pharmaceutically acceptable salt thereof.

15. The method of claim 14, wherein the first compound is:

16. The method of claim 1, wherein the first compound is selected from the group consisting of:

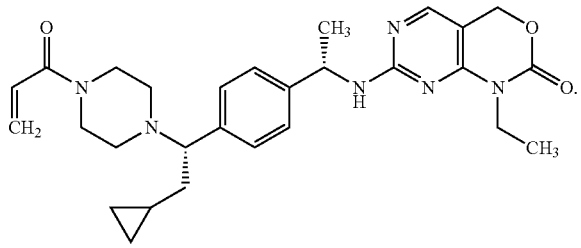 [SMILES: C=CC(=O)N1CCN([C@@H](CC2CC2)c2ccc([C@H](C)Nc3ncc4c(n3)N(CC)C(=O)OC4)cc2)CC1]

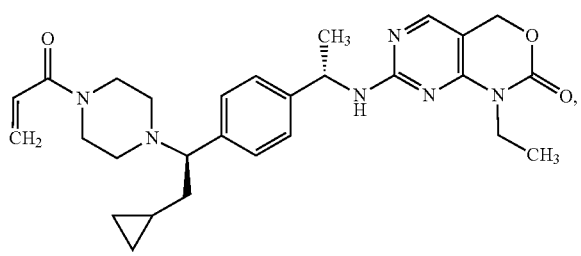

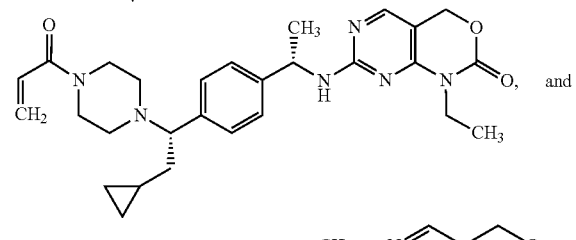

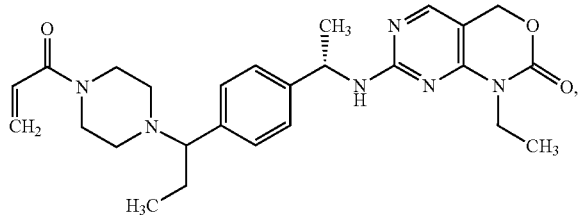

or a pharmaceutically acceptable salt thereof.

17. The method of claim 1, wherein the second compound is an antimetabolite agent, or a pharmaceutically acceptable salt thereof.

18. The method of claim 17, wherein the antimetabolite agent is cytarabine, or a pharmaceutically acceptable salt thereof.

19. The method of claim 1, wherein the second compound is a hypomethylating agent, or a pharmaceutically acceptable salt thereof.

20. The method of claim 19, wherein the hypomethylating agent is azacitidine, or a pharmaceutically acceptable salt thereof.

21. The method of claim 19, wherein the method further comprises administering to the human cancer subject having an isocitrate dehydrogenase (IDH) mutation a therapeutically effective amount of a B-cell lymphoma 2 (Bcl-2) inhibitor, or a pharmaceutically acceptable salt thereof.

22. The method of claim 19, wherein the method further comprises administering to the human cancer subject having an isocitrate dehydrogenase (IDH) mutation a therapeutically effective amount of venetoclax, or a pharmaceutically acceptable salt thereof.

23. The method of claim 1, wherein:
the cancer is acute myelogenous leukemia;
(a) the first compound is:

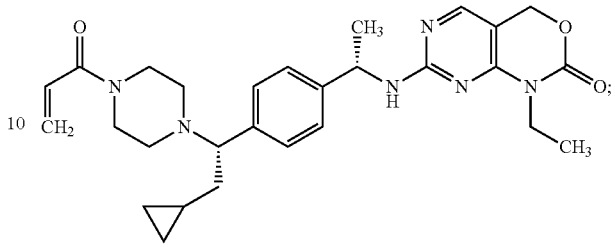

and
(b) the second compound is cytarabine, or a pharmaceutically acceptable salt thereof.

24. The method of claim 1, wherein:
the cancer is acute myelogenous leukemia;
(a) the first compound is:

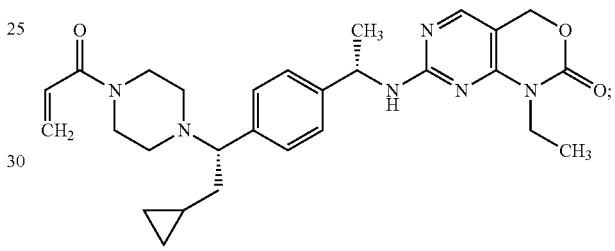

and
(b) at least one second compound is azacitidine, or a pharmaceutically acceptable salt thereof.

25. The method of claim 24, wherein an additional second compound is midostaurin, or a pharmaceutically acceptable salt thereof.

26. The method of claim 24, wherein the method further comprises administering to the human cancer subject having an isocitrate dehydrogenase (IDH) mutation a therapeutically effective amount of venetoclax, or a pharmaceutically acceptable salt thereof.

27. The method of claim 1, wherein:
the cancer is acute myelogenous leukemia;
(a) the first compound is:

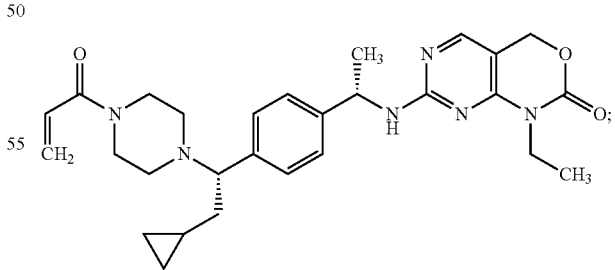

and
(b) the second compound is midostaurin, or a pharmaceutically acceptable salt thereof.

* * * * *